(12) United States Patent
Furuhashi et al.

(10) Patent No.: US 11,845,254 B2
(45) Date of Patent: Dec. 19, 2023

(54) SHEET SEPARATION DEVICE, SHEET LAMINATOR, IMAGE FORMING APPARATUS, AND IMAGE FORMING SYSTEM

(71) Applicant: Ricoh Company, Ltd., Tokyo (JP)

(72) Inventors: Tomohiro Furuhashi, Kanagawa (JP); Wataru Takahashi, Tokyo (JP); Sho Asano, Kanagawa (JP); Yoshito Suzuki, Chiba (JP); Shinya Monma, Kanagawa (JP); Joji Akiyama, Kanagawa (JP); Yohsuke Haraguchi, Kanagawa (JP); Wataru Nozaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/228,873

(22) Filed: Apr. 13, 2021

(65) Prior Publication Data
US 2021/0325804 A1 Oct. 21, 2021

(30) Foreign Application Priority Data
Apr. 15, 2020 (JP) ................................ 2020-072999

(51) Int. Cl.
*B32B 43/00* (2006.01)
*B32B 37/00* (2006.01)
*G03G 15/00* (2006.01)

(52) U.S. Cl.
CPC ........ *B32B 43/006* (2013.01); *B32B 37/0046* (2013.01); *G03G 15/6573* (2013.01);
(Continued)

(58) Field of Classification Search
CPC ............. B32B 43/006; Y10T 156/1168; Y10T 156/1174; Y10T 156/195; Y10T 156/1978
See application file for complete search history.

(56) References Cited

U.S. PATENT DOCUMENTS 5,279,195 A * 1/1994 Breton .................. B65H 29/58
83/365
5,358,591 A * 10/1994 Candore ............. B29C 63/0013
156/707
(Continued)

FOREIGN PATENT DOCUMENTS

CN 104229505 A 12/2014
CN 110194383 A 9/2019
(Continued)

OTHER PUBLICATIONS

Extended European Search Report dated Sep. 7, 2021 in European Patent Application No. 21167824.8, 6 pages.
(Continued)

*Primary Examiner* — Philip C Tucker
*Assistant Examiner* — Nickolas R Harm
(74) *Attorney, Agent, or Firm* — XSENSUS LLP

(57) ABSTRACT

A sheet separation device is configured to separate a non-bonding portion of a two-ply sheet in which two sheets are overlapped and bonded together at one end as a bonding portion of the two-ply sheet. The sheet separation device includes a conveyance roller pair and circuitry. The conveyance roller pair is configured to convey the two-ply sheet while nipping the two-ply sheet, when separating the non-bonding portion of the two-ply sheet. The circuitry is configured to control sheet conveyance. The circuitry is configured to stop the conveyance roller pair, cause a leading end of the two-ply sheet conveyed toward the conveyance roller pair to contact a nip region of the conveyance roller pair while the conveyance roller pair is stopped, and start the conveyance roller pair to rotate to nip the two-ply sheet.

19 Claims, 15 Drawing Sheets

(52) U.S. Cl.
CPC .. *G03G 15/6582* (2013.01); *B32B 2037/0061* (2013.01); *B32B 2309/70* (2013.01); *Y10T 156/1168* (2015.01); *Y10T 156/1174* (2015.01); *Y10T 156/195* (2015.01); *Y10T 156/1978* (2015.01)

(56) References Cited

U.S. PATENT DOCUMENTS

| | | | |
|---|---|---|---|
| 5,879,505 A * | 3/1999 | Fujisawa | B65H 41/00 |
| | | | 156/760 |
| 7,775,520 B2 * | 8/2010 | Matsudaira | B65H 29/62 |
| | | | 271/96 |
| 10,857,776 B2 | 12/2020 | Morinaga et al. | |
| 2005/0224205 A1 * | 10/2005 | Michler | B65H 35/02 |
| | | | 162/232 |
| 2011/0073234 A1 | 3/2011 | Lee et al. | |
| 2018/0257900 A1 | 9/2018 | Suzuki et al. | |
| 2019/0010011 A1 | 1/2019 | Watanabe et al. | |
| 2019/0276263 A1 | 9/2019 | Hidaka et al. | |
| 2019/0284008 A1 | 9/2019 | Sakano et al. | |
| 2019/0284009 A1 | 9/2019 | Suzuki et al. | |
| 2019/0284010 A1 | 9/2019 | Asami et al. | |
| 2019/0284011 A1 | 9/2019 | Furuhashi et al. | |
| 2019/0284012 A1 * | 9/2019 | Yoneyama | B65H 29/125 |
| 2019/0367317 A1 | 12/2019 | Haraguchi et al. | |
| 2020/0140222 A1 | 5/2020 | Takahashi et al. | |
| 2020/0239265 A1 | 7/2020 | Suzuki et al. | |
| 2020/0247107 A1 | 8/2020 | Morinaga et al. | |
| 2020/0247636 A1 | 8/2020 | Furuhashi et al. | |
| 2020/0270093 A1 | 8/2020 | Suzuki et al. | |
| 2020/0338877 A1 | 10/2020 | Takahashi et al. | |
| 2020/0341414 A1 | 10/2020 | Watanabe et al. | |
| 2020/0385231 A1 | 12/2020 | Kunieda et al. | |
| 2020/0407187 A1 | 12/2020 | Hidaka et al. | |
| 2021/0039900 A1 | 2/2021 | Shimazu et al. | |
| 2021/0039916 A1 | 2/2021 | Sugiyama et al. | |

FOREIGN PATENT DOCUMENTS

| | | | |
|---|---|---|---|
| CN | 111847022 A | 10/2020 | |
| DE | 197 25 609 A1 | 12/1998 | |
| GB | 2473888 A | 3/2011 | |
| JP | 9-164593 | 6/1997 | |
| JP | 2006-142532 | 6/2006 | |
| JP | 2006-160429 | 6/2006 | |
| JP | 2020121868 A * | 8/2020 | ........... B32B 37/185 |

OTHER PUBLICATIONS

Office Action dated Apr. 28, 2022 in Chinese Patent Application No. 202110380569.5, 7 pages.

* cited by examiner

SHEET SEPARATION DEVICE, SHEET LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119(a) to Japanese Patent Application No. 2020-072999, filed on Apr. 15, 2020, in the Japan Patent Office, the entire disclosure of which is hereby incorporated by reference herein.

BACKGROUND

Technical Field

Embodiments of the present disclosure relate to a sheet separation device configured to separate the non-bonding portion of a two-ply sheet in which two sheets are overlapped and bonded together at a bonding portion of the two-ply sheet, a sheet laminator including the sheet separation device, an image forming apparatus including the sheet separation device, such as a copier, a printer, a facsimile machine, and a multi-functional apparatus having at least two functions of the copier, the printer, and the facsimile machine, and an image forming system including the sheet separation device.

Background Art

Various types of sheet separation devices (i.e., sheet laminators) are known to separate a two-ply sheet in which two sheets are overlapped and bonded together at a bonding portion on one end of the two-ply sheet.

Specifically, a known sheet laminator includes the sheet laminator (the sheet separation device) that separates two sheets of a laminated sheet that is a two-ply sheet in which one sides of the two sheets are bonded at one end of the two-ply sheet, and inserts protective paper that is an inner sheet between the two sheets.

SUMMARY

Embodiments of the present disclosure described herein provide a novel sheet separation device that is configured to separate a non-bonding portion of a two-ply sheet in which two sheets are overlapped and bonded together at one end as a bonding portion of the two-ply sheet. The sheet separation device includes a conveyance roller pair and circuitry. The conveyance roller pair is configured to convey the two-ply sheet while nipping the two-ply sheet, when separating the non-bonding portion of the two-ply sheet. The circuitry is configured to control sheet conveyance. The circuitry is configured to stop the conveyance roller pair, cause a leading end of the two-ply sheet conveyed toward the conveyance roller pair to contact a nip region of the conveyance roller pair while the conveyance roller pair is stopped, and start the conveyance roller pair to rotate to nip the two-ply sheet.

Further, embodiments of the present disclosure described herein provide a sheet laminator including the above-described sheet separation device and a sheet lamination device configured to perform a lamination process on the two-ply sheet in which an inner sheet is inserted between the two sheets separated by the sheet separation device.

Further, embodiments of the present disclosure described herein provide an image forming apparatus including one of the above-described sheet separation device and the above-described laminator, and an image forming device configured to form an image on a sheet to be conveyed to the sheet separation device.

Further, embodiments of the present disclosure described herein provide an image forming system including an image forming apparatus configured to form an image on a sheet, and one of the above-described sheet separation device and the above-described laminator.

Further, embodiments of the present disclosure described herein provide a novel sheet separation device that is configured to separate a non-bonding portion of a two-ply sheet in which two sheets are overlapped and bonded together at one end as a bonding portion of the two-ply sheet. The sheet separation device includes a conveyance roller pair and circuitry. The conveyance roller pair is configured to convey the two-ply sheet while nipping the two-ply sheet, when separating the non-bonding portion of the two-ply sheet. The circuitry is configured to control sheet conveyance. The circuitry is configured to cause the conveyance roller pair to nip the one end of the two-ply sheet with the non-bonding portion being separated, stop the conveyance roller pair in a state in which the one end of the two-ply sheet is nipped by the conveyance roller pair with the non-bonding portion being separated, cause one end of an inner sheet to contact the conveyance roller pair, convey the inner sheet toward the one end of the two-ply sheet via the non-bonding portion between the two sheets separated from each other, and start the conveyance roller pair to rotate to convey the two-ply sheet in which the inner sheet is inserted between the two sheets, toward the one end of the two-ply sheet.

Further, embodiments of the present disclosure described herein provide a sheet laminator including the above-described sheet separation device and a sheet lamination device configured to perform a lamination process on the two-ply sheet in which an inner sheet is inserted between the two sheets separated by the sheet separation device.

Further, embodiments of the present disclosure described herein provide an image forming apparatus including one of the above-described sheet separation device and the above-described laminator, and an image forming device configured to form an image on a sheet to be conveyed to the sheet separation device.

Further, embodiments of the present disclosure described herein provide an image forming system including an image forming apparatus configured to form an image on a sheet, and one of the above-described sheet separation device and the above-described laminator.

BRIEF DESCRIPTION OF THE SEVERAL VIEWS OF THE DRAWINGS

Exemplary embodiments of this disclosure will be described in detail based on the following figures, wherein:

FIG. 12 including

Figure 1:
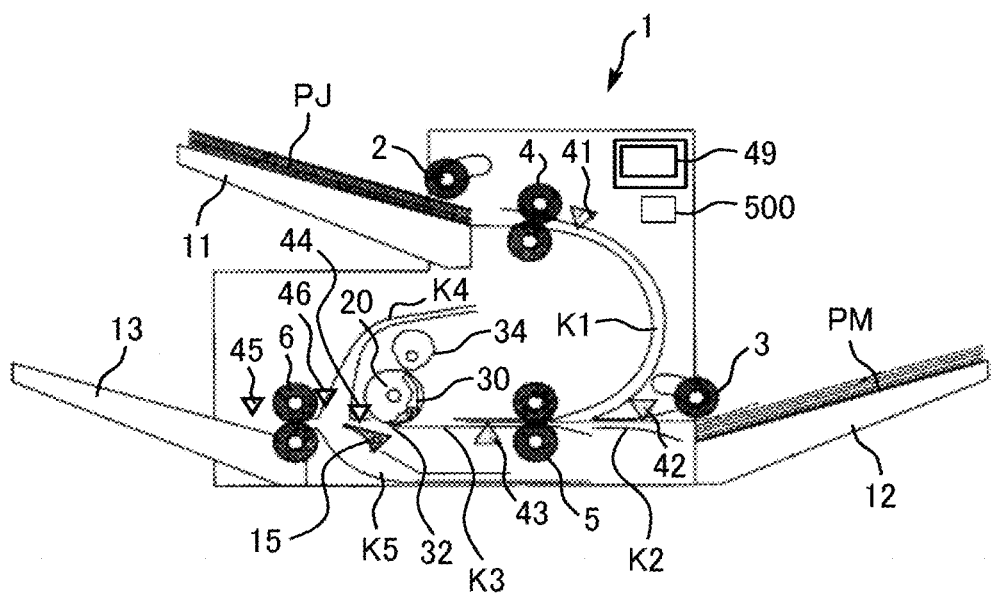
FIG. 1 is a schematic view illustrating an overall configuration of a sheet separation device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of a sheet separation device, a sheet laminator, an image forming apparatus, and an image forming system, according to an embodiment of the present disclosure, with reference to drawings. Note that identical parts or equivalents are given identical reference numerals and redundant descriptions are summarized or omitted accordingly.

First, a description is given of the overall configuration and operations performed in a sheet separation device 1 according to an embodiment of the present disclosure, with reference to FIG. 1.

FIG. 1 is a schematic view illustrating an overall configuration of a sheet separation device according to an embodiment of the present disclosure.

The sheet separation device 1 separates a non-bonding portion of a two-ply sheet PJ in which two sheets P1 and P2 are overlapped and bonded together at one end of the two-ply sheet PJ as a bonding portion A of the two-ply sheet PJ (see FIGS. 11A to 11E and other drawings).

In particular, in the present embodiment, the two-ply sheet PJ is made of two sheets P1 and P2 overlapped and bonded together at one side of four sides as the bonding portion A. That is, in the two-ply sheet PJ made of two sheets P1 and P2, one sides (the bonding portion A) of the two sheets P1 and P2 are connected by, e.g., thermal welding, and the other sides of the two sheets P1 and P2 are not connected. As the two sheets P1 and P2 constructing the two-ply sheet PJ, a transparent film sheet (that is, a laminated sheet) may be employed.

The sheet separation device 1 separates the two sheets P1 and P2 constructing the two-ply sheet PJ, in other words, separates the other side of the two sheets that is opposite the bonding portion A that maintains bonding of the two sheets P1 and P2. Subsequently, an inner sheet PM is inserted between the separated two sheets P1 and P2 of the two-ply sheet PJ. The inner sheet PM is a sheet including at least one plain sheet or a photograph.

As illustrated in FIG. 1, the sheet separation device 1 includes a first feed tray 11, a second feed tray 12, a first feed roller 2, a second feed roller 3, a first conveyance roller pair 4, a second conveyance roller pair 5, a third conveyance roller pair 6, an ejection tray 13, a first sensor 41, a second sensor 42, a third sensor 43, a fourth sensor 44, a fifth sensor 45, an abnormality detection sensor 46 as an abnormality detector, a winding roller 20, a moving mechanism 30, and a separation claw 16 as a separator (see FIGS. 7A to 7C or FIGS. 11A to 11E). Each of the first conveyance roller pair 4, the second conveyance roller pair 5, and the third conveyance roller pair 6 functions as a conveyance member. The ejection tray 13 functions as a sheet stacker.

The sheet separation device 1 further includes a plurality of sheet conveyance passages such as a first sheet conveyance passage K1, a second sheet conveyance passage K2, a third sheet conveyance passage K3, a first branched sheet conveyance passage K4, and a second branched sheet conveyance passage K5. Each of the first sheet conveyance passage K1, the second sheet conveyance passage K2, the third sheet conveyance passage K3, the first branched sheet conveyance passage K4, and the second branched sheet conveyance passage K5 includes two conveyance guides (guide plates) facing each other to guide and convey the sheet such as the two-ply sheet PJ and the inner sheet PM. The sheet separation device 1 further includes a controller 500 that controls sheet conveyance of the sheet (i.e., the two-ply sheet PJ and the inner sheet PM) by performing, e.g., a sheet separating operation, a sheet laminating operation, and a sheet inserting operation. The controller 500 is connected to various drivers driving various parts and units, for example, the above-described parts and units included in the sheet separation device 1.

To be more specific, the two-ply sheet PJ is loaded on the first feed tray 11. The first feed roller 2 feeds the uppermost two-ply sheet PJ on the first feed tray 11 to the first conveyance roller pair 4, and the first conveyance roller pair 4 conveys the two-ply sheet PJ along the first sheet conveyance passage K1.

The inner sheet PM is loaded on the second feed tray 12. The second feed roller 3 feeds the uppermost inner sheet PM on the second feed tray 12 to the second sheet conveyance passage K2.

Each of the first conveyance roller pair 4, the second conveyance roller pair 5, and the third conveyance roller pair 6 includes a drive roller and a driven roller, and conveys the sheet nipped by the respective nip regions. The third sheet conveyance passage K3 is a passage from the second conveyance roller pair 5 to the third conveyance roller pair 6 and includes the second conveyance roller pair 5, the winding roller 20, and the third conveyance roller pair 6 in this order from upstream to downstream in the sheet conveyance direction. In particular, the winding roller 20 and the third conveyance roller pair 6 are configured to be rotatable in a forward direction or in a reverse direction. The third conveyance roller pair 6 conveys the sheet in the forward direction that is the left direction in FIG. 1 and in the reverse direction that is the right direction in FIG. 1. The third conveyance roller pair 6 also functions as an ejection roller pair that ejects the sheet to the ejection tray 13.

Each of the first sensor 41, the second sensor 42, the third sensor 43, the fourth sensor 44, and the fifth sensor 45 functions as a sheet detector employing a reflective photosensor that optically detects whether the sheet is present at the position of each sensor. The first sensor 41 is disposed near a portion downstream from the first conveyance roller pair 4 in the sheet conveyance direction. The second sensor 42 is disposed near a portion downstream from the second feed roller 3 in the sheet conveyance direction. The third sensor 43 is disposed near a portion downstream from the second conveyance roller pair 5 in the sheet conveyance direction. The fourth sensor 44 is disposed near a portion downstream from the winding roller 20 (at the left side of the winding roller 20 in FIG. 1) and upstream from the third conveyance roller pair 6 (at the right side of the third conveyance roller pair 6 in FIG. 1) in the sheet conveyance direction. The fifth sensor 45 is disposed near a portion downstream from the third conveyance roller pair 6 (at the left side of the third conveyance roller pair 6 in FIG. 1) in the sheet conveyance direction.

A description is given of the winding roller 20 with reference to FIGS. 2A, 2B, 3A, 3B, 6B, 6C, 6D, and 7A.

Figure 6A:
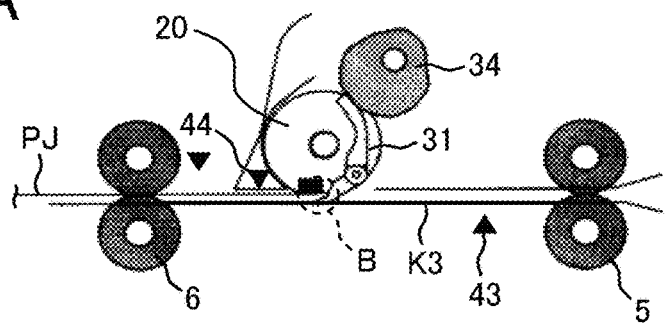
FIGS. 6A to 6D are schematic views, each illustrating the sheet separating operation performed in the sheet separation device, subsequent from the sheet separating operation of each of FIGS. 5A to 5D.
Figure 6B:
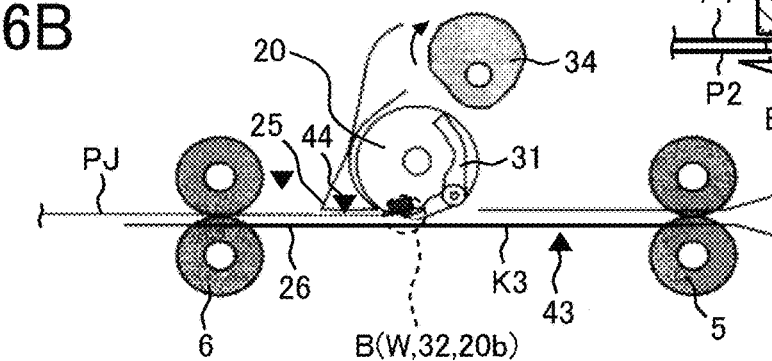

The winding roller 20 functions as a roller including a gripper 32 (handle) that grips a gripped portion B of the two-ply sheet PJ at a winding start position W (see FIG. 6B). The gripped portion B is an end of the two-ply sheet PJ that is opposite an end at which the bonding portion A is formed and also is a leading end of the two-ply sheet PJ in the sheet conveyance direction to be conveyed in the right direction in FIG. 1, which is referred to as the other end of the two-ply sheet PJ. In a state in which the gripper 32 grips the gripped portion B of the two-ply sheet PJ, the winding roller 20 rotates in a predetermined rotational direction (counterclockwise direction in FIG. 6B to 6D) to wind the two-ply sheet PJ around the winding roller 20. The winding roller 20 is rotatable about a rotary shaft 20a in the forward direction and in the reverse direction. The controller 500 controls a drive motor that drives the winding roller 20.

To be more specific, the two-ply sheet PJ starts from the first feed tray 11 and passes through the first sheet conveyance passage K1, and the second conveyance roller pair 5 conveys the two-ply sheet PJ in the forward direction along the third sheet conveyance passage K3. The two-ply sheet PJ passes through the winding start position W of the winding roller 20 once and is conveyed to a position of the third conveyance roller pair 6 that is a position at which the trailing end of the two-ply sheet PJ passes through the fourth sensor 44 but does not pass through the third conveyance roller pair 6, that is, the position before the third conveyance roller pair 6. Thereafter, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed in a state in which the other end (leading end) of the two-ply sheet PJ is gripped, and the winding roller 20 rotates in the counterclockwise direction in FIG. 1 to wind the two-ply sheet PJ around the winding roller 20.

Figure 6C:
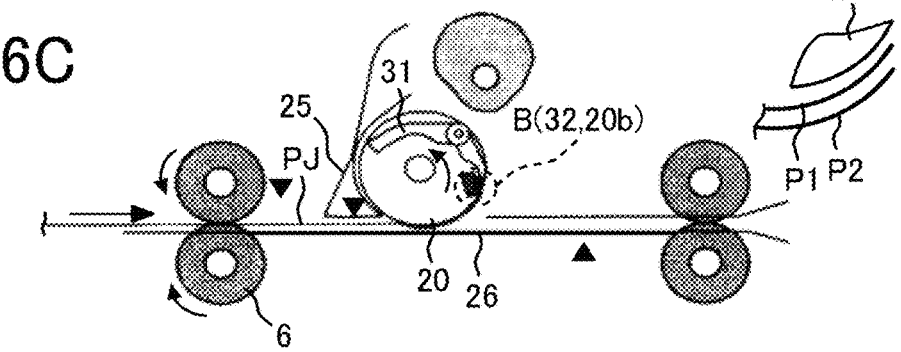
Figure 6D:
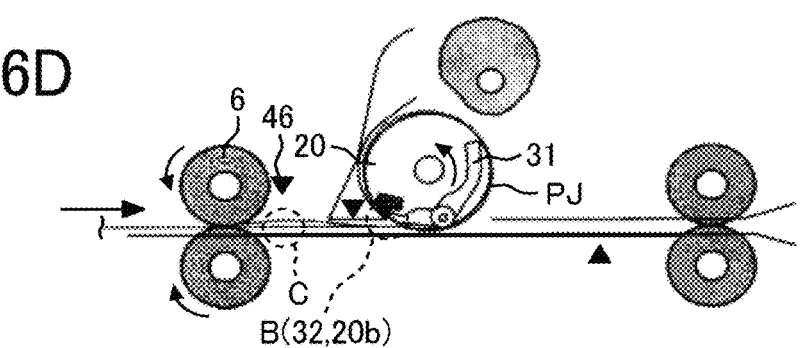
Figure 7A:
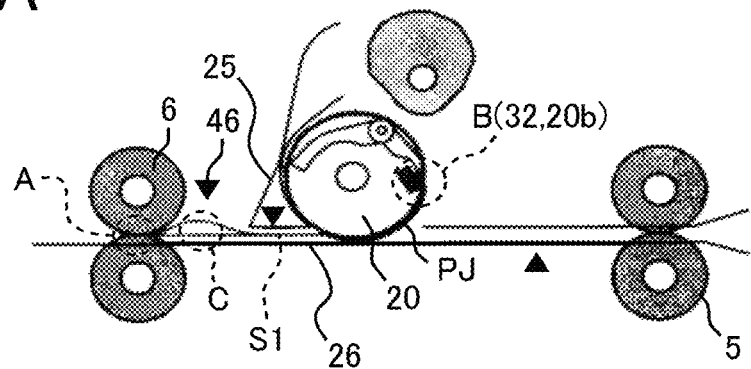
FIGS. 7A to 7C are schematic views, each illustrating the sheet separating operation performed in the sheet separation device, subsequent from the sheet separating operation of each of FIGS. 6A to 6D.

With reference to FIG. 6C', when the two-ply sheet PJ is wound around the winding roller 20, the length of a sheet wound around the winding roller 20 is proportional to the diameter of the winding roller 20. Therefore, since a first sheet P1 is on the inner side to the center of the winding roller 20, that is, closer to the inner circumferential surface of the winding roller 20, than a second sheet P2 on the outer side to the center of the winding roller 20, that is, closer to the outer circumferential surface of the winding roller 20, the length of the first sheet P1 wound around the winding roller 20 is shorter than the length of the second sheet P2 wound around the winding roller 20. As a result, misalignment occurs in a part of the two-ply sheet PJ in which the sheet P1 is in close contact with the sheet P2 (in other words, the part in which the sheet P1 sticks to the sheet P2) other than the bonding portion A and the gripped portion B. The misalignment causes the first sheet P1 to slack and bend toward the second sheet P2, forming a gap C between the two sheets, which are the first sheet P1 and the second sheet P2, in the vicinity of the bonding portion A of the two-ply sheet PJ, as illustrated in FIGS. 6D and 7A. In other words, when the first sheet P1 that is placed on the second sheet P2 is warped upward, the gap C is formed between the first sheet P1 and the second sheet P2 at one end of the two-ply sheet PJ, that is, the upstream side in the sheet conveyance direction when the two-ply sheet PJ is conveyed in the right direction in FIG. 1. As described above, the first sheet P1 and the second sheet P2 that are in close contact with each other without any gap are separated from each other.

Particularly in the present embodiment, in order to significantly form the gap C as described above, that is, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 to wind the two-ply sheet PJ around the rotary shaft 20a, the two-ply sheet PJ is separatable without increasing the size and cost of the sheet separation device 1.

Here, as illustrated in FIG. 6B', the gripper 32 in the present embodiment is configured to grip the gripped portion B of the two-ply sheet PJ without contacting the end surface of the other end of the two-ply sheet PJ, in other words, without contacting the end surface close to the gripped portion B and close to the leading end of the two-ply sheet PJ in the sheet conveyance direction in which the two-ply sheet PJ is conveyed in the right side direction in FIG. 1. By so doing, the two-ply sheet PJ is wound around the winding roller 20 starting from the other end (leading end) of the two-ply sheet PJ in a state in which the other ends (leading ends) of the first sheet P1 and the other ends (leading ends) of the second sheet P2 of the two-ply sheet PJ remain stationary.

To be more specific, the gripper 32 is configured to nip and grip the gripped portion B of the two-ply sheet PJ between the gripper 32 and a receiving portion 20b of the winding roller 20 without causing any member to contact and restrict the end surface of the other end of the two-ply sheet PJ, in other words, without causing any member to hit or contact the end surface of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 in a state in which a specific member such as the gripper 32 contacts the end surface of the other end (that is the leading end face). The two-ply sheet PJ is nipped and gripped by the outer gripper 32 and the inner receiving portion 20b while the end surface of the other end (leading end face) does not contact any member.

Therefore, when compared with a configuration in which the leading end face of the two-ply sheet PJ contacts a member, the above-described structure according to the present embodiment restrains damage on the two-ply sheet PJ (particularly, the leading end). In particular, once the leading end face of the two-ply sheet PJ is damaged, it is difficult to perform lamination on the damaged leading end face. Therefore, the configuration of the present disclosure is useful.

Note that, in the present embodiment, the bonding portion A of the two-ply sheet PJ wound around the winding roller 20 is the one end of the two-ply sheet PJ. The one end is opposite to the other end functioning as the gripped portion B.

In the present embodiment, at least one of the gripper 32 (handle) and the receiving portion 20b is made of elastic material such as rubber.

According to this configuration, when compared with a sheet separation device having a configuration in which the gripper 32 and the receiving portion 20b have rigid bodies made of metal or resin, the above-described sheet separation device 1 according to the present embodiment enhances the gripping force to grip the two-ply sheet PJ and prevents the surfaces of the two-ply sheet PJ from being damaged. In particular, the sheet separation device 1 including the gripper 32 and the receiving portion 20b made of the elastic material easily exhibits the above-described effect.

As illustrated in FIGS. 2A to 3B, the moving mechanism 30 moves the gripper 32 between a gripping position (e.g., the position illustrated in FIGS. 2A and 3A) at which the gripper 32 grips the two-ply sheet PJ and a releasing position (e.g., the position illustrated in FIGS. 2B and 3B) at which the gripper 32 is released from the gripping position.

To be more specific, the moving mechanism 30 includes an arm 31, a compression spring 33, a cam 34, and a motor. The compression spring 33 functions as a biasing member. The motor drives to rotate the cam 34 in the forward direction or the reverse direction.

The arm 31 holds the gripper 32. The arm 31 and the gripper 32 are held together by the winding roller 20 to be rotatable together about a support shaft 31a. In the present embodiment, the gripper 32 is connected to the tip of the arm 31, and the gripper 32 and the arm 31 are made as a single unit. Alternatively, the gripper 32 and the arm 31 may be made as separate members, and the gripper 32 may be mounted on the arm 31, that is, may be held by the arm 31. In any case, the arm 31 holding the gripper 32 rotates about the rotary shaft 20a together with the winding roller 20.

Figure 2A:
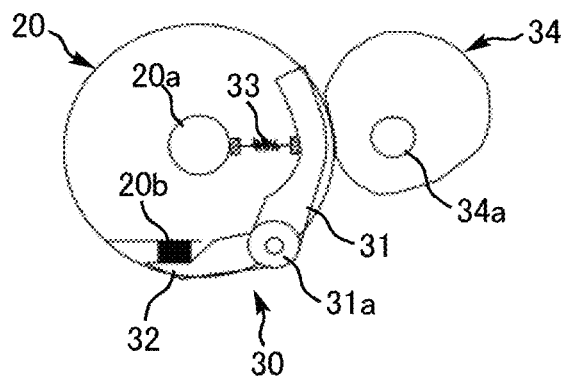
FIG. 2A is a side view illustrating a gripper that has moved to a gripping position in the sheet separation device illustrated in FIG. 1.
Figure 2B:
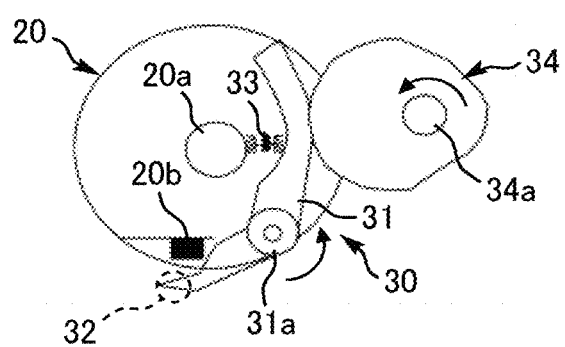
FIG. 2B is a side view illustrating the gripper that has moved to a releasing position in the sheet separation device illustrated in FIG. 1.

The compression spring 33 functions as a biasing member that biases the arm 31 so that the gripper 32 moves from the releasing position illustrated in FIG. 2B to the gripping position illustrated in FIG. 2A. To be more specific, one end of the compression spring 33 is connected to a fixed position near the rotary shaft 20a, and the other end of the compression spring 33 is connected to one end of the arm 31 that is an end opposite to the other end of the arm 31 connected to the gripper 32 with respect to the support shaft 31a.

The cam 34 pushes the arm 31 against the biasing force of the compression spring 33 that functions as the biasing member, so that the gripper 32 moves from the gripping position illustrated in FIG. 2A to the releasing position illustrated in FIG. 2B. The motor controlled by the controller 500 drives the cam 34 to rotate in the forward direction or the reverse direction at a desired rotation angle. The cam 34 is held by the housing of the sheet separation device 1 so as to be rotatable about a cam shaft 34a of the cam 34 independently of the winding roller 20.

In the moving mechanism 30 configured as described above, as illustrated in FIGS. 2A and 3A, in a state in which the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

Figure 3A:
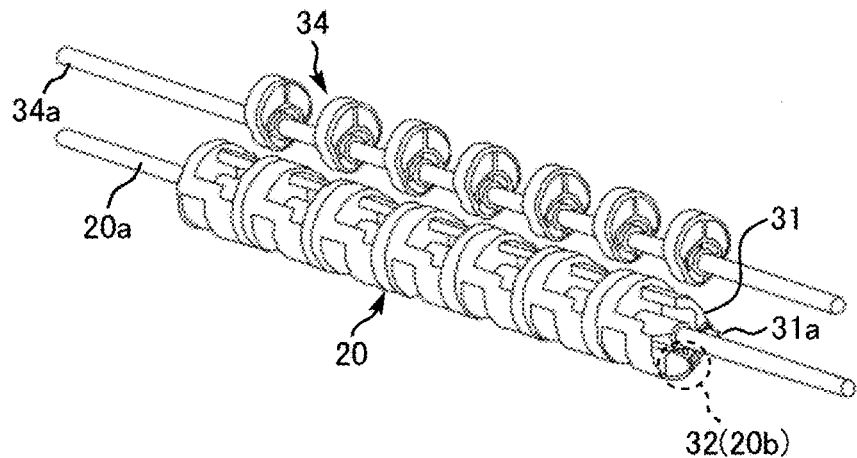
FIG. 3A is a perspective view illustrating the gripper that has moved to the gripping position in the sheet separation device illustrated in FIG. 1.
Figure 3B:
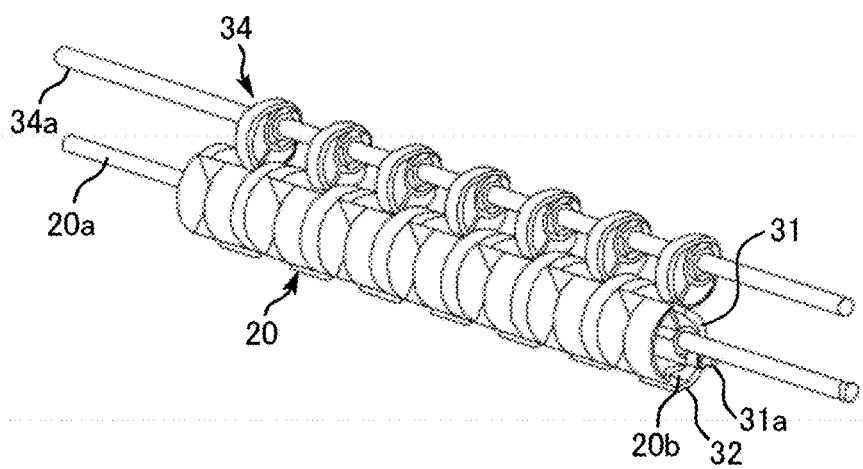
FIG. 3B is a perspective view illustrating the gripper that has moved to the releasing position in the sheet separation device illustrated in FIG. 1.

By contrast, as illustrated in FIGS. 2B and 3B, in a state in which the cam 34 is in press contact with the arm 31, the arm 31 rotates in the counterclockwise direction in FIG. 2B about the support shaft 31a against the biasing force of the compression spring 33, so that the gripper 32 separates from the receiving portion 20b. This state is referred to as an open state. In the open state, the two-ply sheet PJ is not gripped, which is referred to as a grip release state.

Note that, in the present embodiment, as illustrated in FIGS. 3A and 3B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions separated in the axial direction to grip the two-ply sheet PJ as described above, that is, not setting the entire area of the winding roller 20 and the cam 34 in the axial direction to grip the two-ply sheet PJ share load necessary to grip the two-ply sheet PJ. The above-described configuration is useful when a gripping force required to grip the two-ply sheet PJ increases.

Figure 5A:
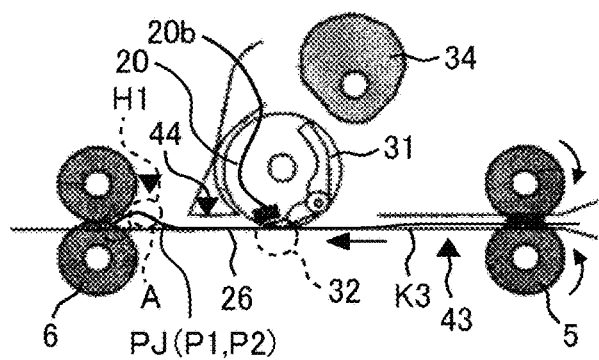
FIGS. 5A to 5D are schematic views, each illustrating the sheet separating operation performed in the sheet separation device, subsequent from the sheet separating operation of FIG. 4.
Figure 5B:
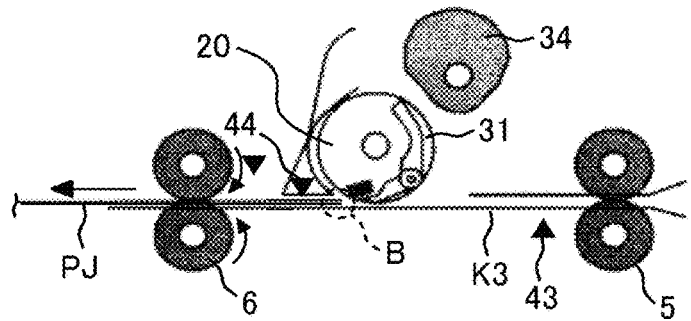
Figure 5C:
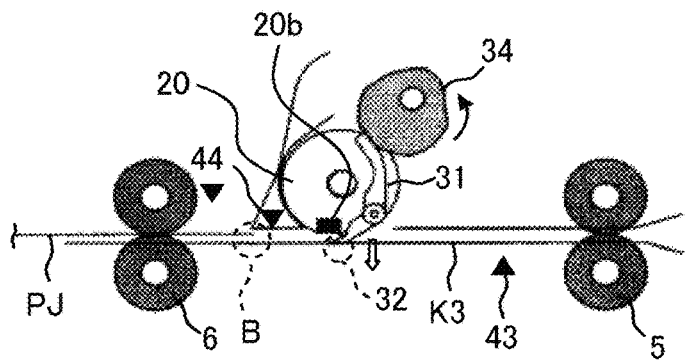
Figure 5D:
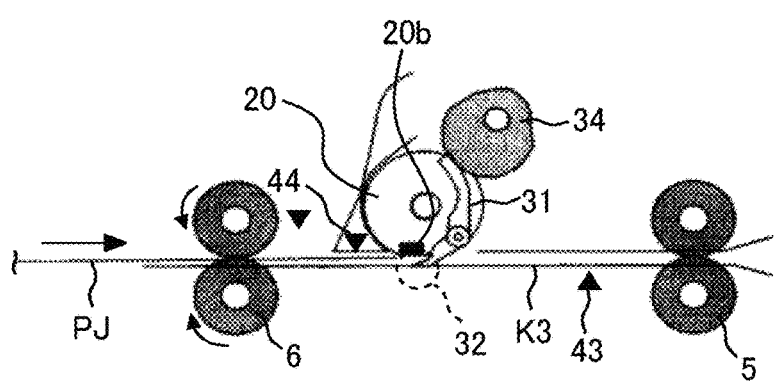

Here, a description is given of the fourth sensor 44 in the sheet separation device 1 according to the present embodiment, with reference to FIGS. 1, 5D, and 6A.

The fourth sensor 44 functions as a sheet detector to detect the two-ply sheet PJ conveyed between the winding roller 20 and the third conveyance roller pair 6. The fourth sensor 44 detects the leading end of the two-ply sheet PJ conveyed to the winding roller 20 in the sheet conveyance direction by the third conveyance roller pair 6. Based on the detection results detected by the fourth sensor 44, the controller 500 controls the moving mechanism 30.

To be more specific, the fourth sensor 44 is disposed in the sheet conveyance passage between the winding roller 20 and the third conveyance roller pair 6. As illustrated in FIGS. 5D and 6A, when the third conveyance roller pair 6 conveys the two-ply sheet PJ in the reverse direction toward the position of the winding roller 20 with the gripped portion B of the two-ply sheet PJ being the leading end, the fourth sensor 44 detects the leading end (that is, the tip of one end of the gripped portion B) of the two-ply sheet PJ conveyed in the reverse direction. The controller 500 uses the detection timing at which the fourth sensor 44 detects the leading end (in the reverse direction) of one end of the gripped portion B as a trigger, so as to adjust and control a timing to stop the two-ply sheet PJ at the gripping position and a timing at which the gripper 32 grips the gripped portion B. To be more specific, after a predetermined time has passed since the fourth sensor 44 detected the leading end of the two-ply sheet PJ, the third conveyance roller pair 6 stops the reverse direction conveyance of the two-ply sheet PJ, and the cam 34 rotates to pivot the arm 31 of the moving mechanism 30 so that the gripper 32 moves from the releasing position illustrated in FIG. 2B to the gripping position illustrated in FIG. 2A.

The above-described control accurately performs an operation in which the other end (leading end) of the two-ply sheet PJ is nipped by the gripper 32 and the receiving portion 20b without contacting the end surface of the two-ply sheet PJ on any member.

As described above, the third conveyance roller pair 6 is a conveyance roller pair that conveys the two-ply sheet PJ with the other end (i.e., the gripped portion B) as a leading end, toward the winding start position W of the winding roller 20 in the third sheet conveyance passage K3 (sheet conveyance passage) between the third conveyance roller pair 6 and the winding roller 20.

Further, when separating the non-bonding portion of the two-ply sheet PJ, the third conveyance roller pair 6 functions as a conveyance roller pair that conveys the two-ply sheet PJ with the other end (the gripped portion B) of the two-ply sheet PJ as the leading end, in a state in which the two-ply sheet PJ is nipped.

Figure 14A:
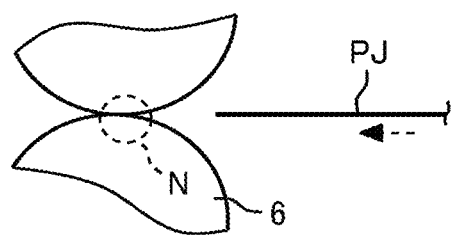
FIGS. 14A to 14C are schematic views, each illustrating a deskewing operation to deskew the two-ply sheet.
Figure 14B:
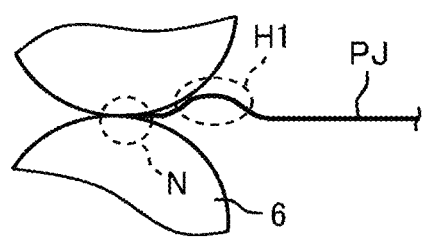
Figure 14C:
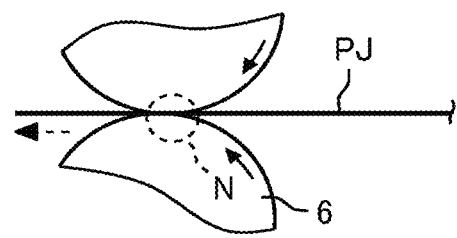

Then, in the present embodiment, as the two-ply sheet PJ is conveyed toward the third conveyance roller pair 6 with the one end (bonding portion A) of the two-ply sheet PJ as the leading end in a state in which the third conveyance roller pair 6 is stopped without rotating, the one end (leading end in the sheet conveyance direction) of the two-ply sheet PJ has contacted the nip region of the third conveyance roller pair 6 over the entire area of the leading end of the two-ply sheet PJ in the width direction of the two-ply sheet PJ, as illustrated in FIGS. 5A and 14B. Thereafter, the third conveyance roller pair 6 starts rotating to nip the two-ply sheet PJ, as illustrated in FIGS. 5B and 14C.

To be more specific, the two-ply sheet PJ are separated to the first sheet P1 and the second sheet P2 or the inner sheet PM is inserted between the first sheet P1 and the second sheet P2 of the two-ply sheet PJ in a state in which the two-ply sheet PJ is nipped by the nip region N of the third conveyance roller pair 6 (see FIG. 14). In particular, even though the third conveyance roller pair 6 conveys the two-ply sheet PJ in the forward direction or the reverse direction after the two-ply sheet PJ has been nipped by the nip region N of the third conveyance roller pair 6, the operation to separate the two-ply sheet PJ and the operation to insert the inner sheet PM into the two-ply sheet PJ are continuously performed without releasing the nip of the two-ply sheet PJ.

Firstly, the two-ply sheet PJ fed from the first feed tray 11 is conveyed through the first sheet conveyance passage K1 and the third sheet conveyance passage K3, toward the nip region N of the third conveyance roller pair 6 (roller nip region), as illustrated in FIG. 14A. At this time, the third conveyance roller pair 6 is stopped without rotating.

Then, as illustrated in FIG. 14B, the leading end of the two-ply sheet PJ (in other words, the leading end in the forward direction, that is, the bonding portion A) contacts the nip region N of the third conveyance roller pair 6. At this time, conveyance of the two-ply sheet PJ is stopped at a timing a bit later than the timing at which the leading end of the two-ply sheet PJ contacts the nip region N of the third conveyance roller pair 6.

To be more specific, referring to the configuration illustrated in FIG. 5A, the second conveyance roller pair 5 stops rotating after a predetermined time T0 has elapsed since detection of the leading end (bonding portion A) of the two-ply sheet PJ by the third sensor 43 (or the fourth sensor 44). This predetermined time T0 is obtained by adding a value of a time T1 obtained by dividing the distance between the third sensor 43 (or the fourth sensor 44) and the nip region N by the conveying speed of the two-ply sheet PJ and a value of a predetermined time T2. The equation for obtaining the predetermined time T0 is expressed as T0=T1+ T2.

Accordingly, as illustrated in FIG. 14B, when the leading end of the two-ply sheet PJ contacts the nip region N, a slight slack (warp) H1 is formed in the two-ply sheet PJ and the leading end of the two-ply sheet PJ contacts the nip region N over the entire area in the width direction of the two-ply sheet PJ (i.e., in the vertical direction of the face of the two-ply sheet PJ in FIGS. 14A to 14C). By so doing, the orientation of two-ply sheet PJ is deskewed, in other words, oblique sheet conveyance of the two-ply sheet PJ is corrected.

Figure 15A:
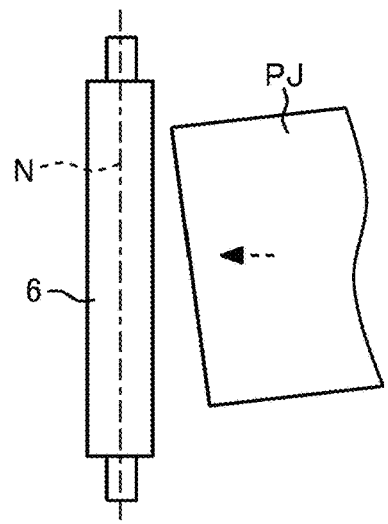
FIGS. 15A and 15B are schematic views, each illustrating the deskewing operation to deskew the two-ply sheet, along the width direction of the two-ply sheet.
Figure 15B:
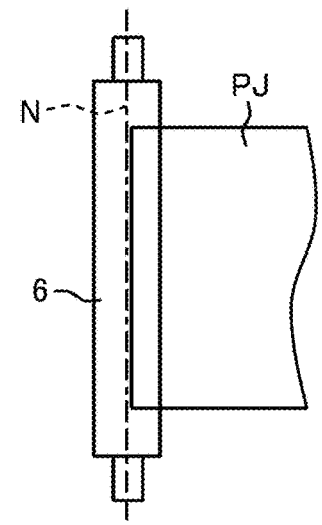

More specifically, as illustrated in FIG. 15A, even if the two-ply sheet PJ is skewed and conveyed toward the third conveyance roller pair 6, in other words, even if the two-ply sheet PJ is conveyed to the third conveyance roller pair 6 in a state in which the orientation of the two-ply sheet PJ is obliquely inclined to the sheet conveyance direction, the leading end of the two-ply sheet PJ rotates in the clockwise direction about the point at which the leading end of the two-ply sheet PJ first contacts the nip region N of the third conveyance roller pair 6. Then, as illustrated in FIG. 15B, the entire area of the leading end of the two-ply sheet PJ in the width direction contacts the nip region N of the third conveyance roller pair 6, so that the two-ply sheet PJ is deskewed along the nip region N of the third conveyance roller pair 6. That is, the leading end of the two-ply sheet PJ faces the third conveyance roller pair 6 in the axial direction of the third conveyance roller pair 6 without being obliquely inclined to the sheet conveyance direction.

Note that skew of the two-ply sheet PJ depends on the part accuracy or assembly accuracy of parts related to conveyance of the two-ply sheet PJ and is caused by misalignment of the parts from the target dimension or position.

As described above, the sheet separation device 1 according to the present embodiment firstly corrects the skew of the two-ply sheet PJ, then separates the two-ply sheet PJ, and inserts the inner sheet PM into the separated two-ply sheet PJ. By so doing, the inner sheet PM is inserted into the two-ply sheet PJ with high positional accuracy. That is, since the inner sheet PM is inserted into the two-ply sheet PJ after the two-ply sheet PJ is deskewed, this configuration restrains the inconvenience in which the inner sheet PM is inserted into the two-ply sheet PJ in a state in which the inner sheet PM is relatively inclined to the two-ply sheet PJ.

In particular, in the present embodiment, in order to perform a series of operations from the operation to separate the two-ply sheet PJ to the operation to insert the inner sheet PM into the two-ply sheet PJ, the skew of the two-ply sheet PJ is corrected immediately before the third conveyance roller pair 6 nips the two-ply sheet PJ. Therefore, when compared with the configuration in which the deskewing operation is performed in the previous step (for example, the deskewing operation is performed when the first conveyance roller pair 4 or the second conveyance roller pair 5 grips the two-ply sheet PJ), it is less likely to cause an inconvenience in which a new skew occurs after completion of the deskewing operation and the positional accuracy of the inner sheet PM to be inserted into the two-ply sheet PJ deteriorates.

Further, in the present embodiment, as illustrated in FIGS. 9B and 16A to 16C, in a state in which the third conveyance roller pair 6 is stopped without rotating, the third conveyance roller pair 6 (conveyance roller pair) of the present embodiment nips the one end (bonding portion A) of the two-ply sheet PJ with the non-bonding portion being separated. In this state, the inner sheet PM is conveyed toward the one end (to the left in FIGS. 9A to 9C and 16A to 16C) of the two-ply sheet PJ from between the first sheet P1 and the second sheet P2 in a state in which the first sheet P1 and the second sheet P2 of the two-ply sheet PJ are separated from each other. The one end of the inner sheet PM that is conveyed toward the one end of the two-ply sheet PJ contacts (abuts) against the third conveyance roller pair 6 over the entire area in the width direction of the inner sheet PM. Thereafter, the third conveyance roller pair 6 starts rotating to convey the two-ply sheet PJ in which the inner sheet PM is inserted between the first sheet P1 and the second sheet P2, toward the one end (to the left in FIGS. 9A to 9C and 16A to 16C) of the two-ply sheet PJ.

Figure 16A:
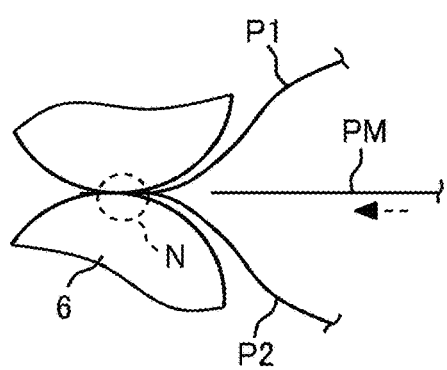
FIGS. 16A to 16C are schematic views, each illustrating the deskewing operation to deskew the inner sheet.

To be more specific, firstly, the inner sheet PM that is fed from the second feed tray 12 is conveyed to the second sheet conveyance passage K2 and the third sheet conveyance passage K3. Then, as illustrated in FIG. 16A, the inner sheet PM is conveyed toward the nip region N of the third conveyance roller pair 6. At this time, the third conveyance roller pair 6 nips the leading end (in the forward direction, that is, the bonding portion A) of the two-ply sheet PJ with the first sheet P1 and the second sheet P2 being separated from each other and, at the same time, is stopped without rotating.

Figure 16B:
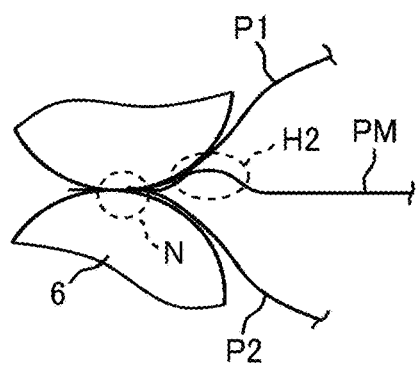

Then, as illustrated in FIG. 16B, the leading end (in the forward direction) of the inner sheet PM contacts the nip region N of the third conveyance roller pair 6 via the gap (nip region) of the two-ply sheet PJ. At this time, conveyance of the inner sheet PM is stopped at a timing a bit later than the timing at which the leading end of the inner sheet PM contacts the nip region N of the third conveyance roller pair 6 (i.e., the nip region of the two-ply sheet PJ).

Figure 9A:
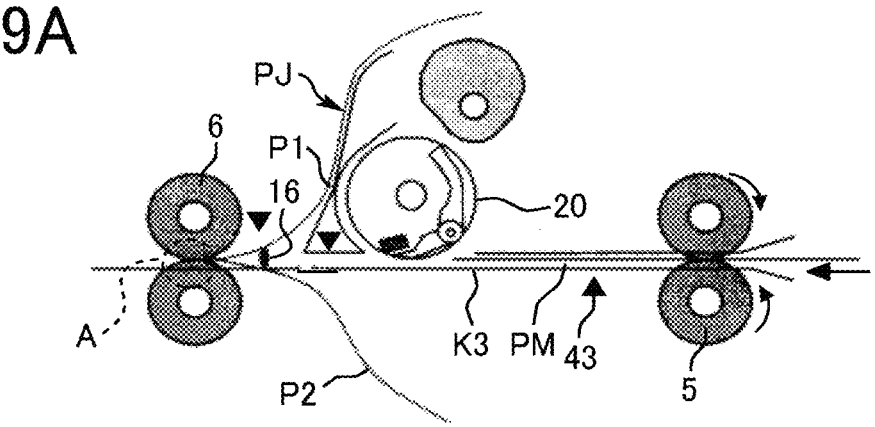
FIGS. 9A to 9C are schematic views, each illustrating the sheet separating operation performed in the sheet separation device, subsequent from the sheet separating operation of each of FIGS. 8A to 8C.
Figure 9B:
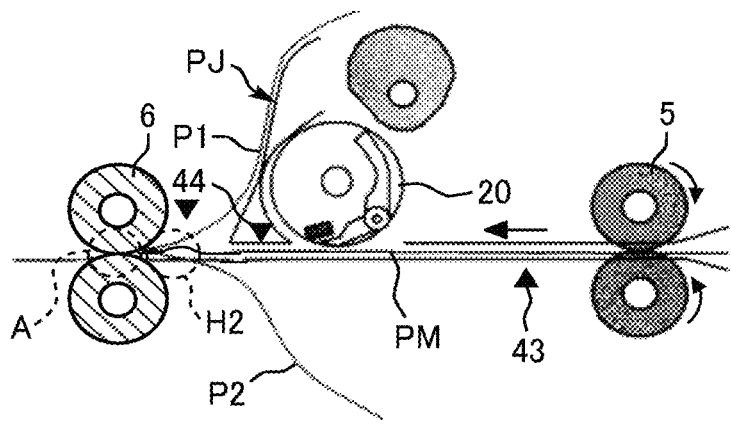

To be more specific, with reference to FIG. 9B, after the predetermined time T0 has elapsed since detection of the leading end of the inner sheet PM by the third sensor 43 (or the fourth sensor 44), the second conveyance roller pair 5 stops rotating. This predetermined time T0 is obtained by adding a value of a time T1 obtained by dividing the distance between the third sensor 43 (or the fourth sensor 44) and the nip region N by the conveying speed of the inner sheet PM and a value of a predetermined time T2. The equation for obtaining the predetermined time T0 is expressed as T0=T1+ T2. The conveying speed of the inner sheet PM is the same value as the conveying speed of the two-ply sheet PJ.

Figure 16C:
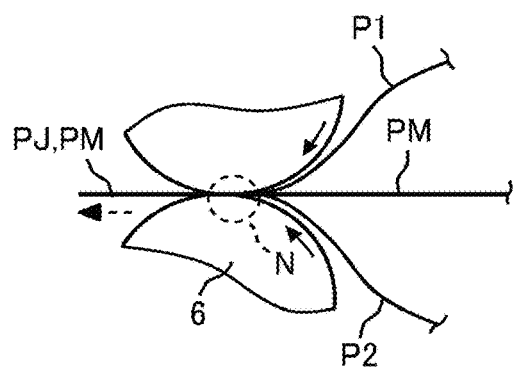

Accordingly, as illustrated in FIG. 16B, when the leading end of the inner sheet PM contacts the nip region N, a slight slack H2 (warp) is formed in the inner sheet PM and the leading end of the inner sheet PM contacts the nip region N over the entire area in the width direction of the inner sheet PM (i.e., in the vertical direction of the face of the two-ply sheet PJ in FIGS. 16A to 16C). By so doing, the orientation of the inner sheet PM is deskewed, in other words, oblique sheet conveyance of the inner sheet PM is corrected.

Note that the reason of generation of the skew of the inner sheet PM and the mechanism to deskew, in other words, to correct the skew as the same as the skew of the two-ply sheet PJ that is previously described with reference to FIGS. 15A and 15B).

As described above, the sheet separation device 1 according to the present embodiment firstly corrects the skew of the inner sheet PM, then inserts the inner sheet PM into the two-ply sheet PJ with the first sheet P1 and the second sheet P2 being separated. By so doing, the inner sheet PM is inserted into the two-ply sheet PJ with high positional accuracy. That is, since the inner sheet PM is inserted into the two-ply sheet PJ after the inner sheet PM is deskewed, this configuration restrains the inconvenience in which the inner sheet PM is inserted into the two-ply sheet PJ in a state in which the inner sheet PM is relatively inclined to the two-ply sheet PJ.

In particular, in the present embodiment, the deskewed inner sheet PM is inserted into the deskewed two-ply sheet PJ. Since the two-ply sheet PJ has the same reference of deskewing (correcting the skew) as the inner sheet PM, where the reference is the nip region N of the third conveyance roller pair 6, the inner sheet PM is inserted into the two-ply sheet PJ with higher positional accuracy.

Note that, in the present embodiment, the controller 500 controls deskewing (deskewing operation), in other words, skew correction (skew correcting operation) in which the two-ply sheet PJ and the inner sheet PM directly contact at the same conveying speed and the same time. However, the control of deskewing, that is, skew correction is not limited to the above-described control but may be performed at different conveying speeds and the different times.

Now, a description is given of the separation claws 16 each functioning as a separator, with reference to FIGS. 7A to 7C, 10, 11A to 11E, and 13.

Figure 13:
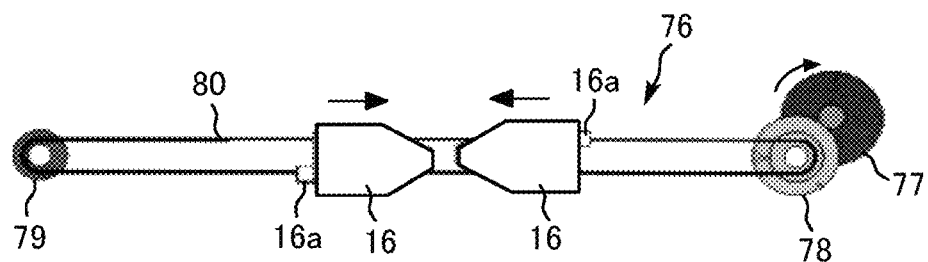
FIG. 13 is a schematic view illustrating the configuration of a moving mechanism to move the separation claws.

Each of the separation claws 16 is a claw-shaped member that moves from the standby position illustrated in FIG. 13 and is inserted into the gap C formed between the first sheet P1 and the second sheet P2 of the two-ply sheet PJ at a predetermined position of the two-ply sheet PJ.

To be more specific, the separation claws 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ in which the other end (that is the gripped portion B) is wound by the winding roller 20 and the one end (that is the bonding portion A) is nipped by the third conveyance roller pair 6.

Figure 7B:
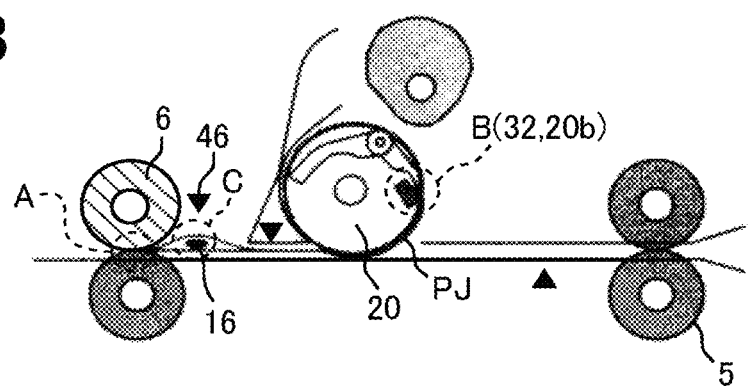
Figure 7C:
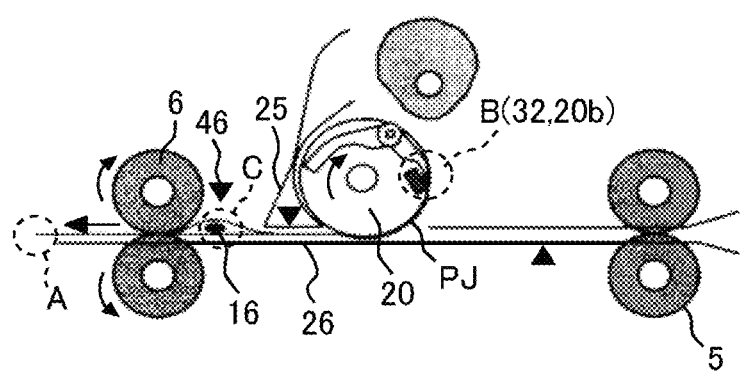
Figure 10:
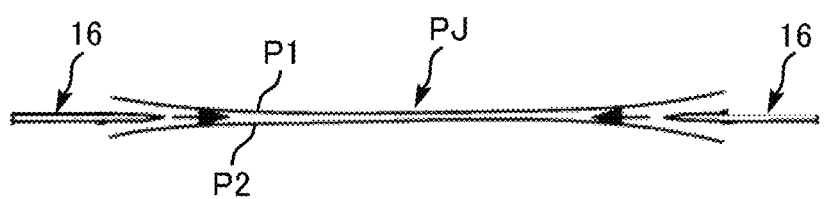
FIG. 10 is a schematic view illustrating separation claws, each being inserted into a two-ply sheet in a width direction of the two-ply sheet.

More specifically, in the present embodiment, the separation claws 16 are a pair of separation claws that functions as a pair of separators disposed at both sides of the third conveyance passage K3 in the width direction that is the direction perpendicular to a plane on which FIGS. 7A to 7C are illustrated and the horizontal direction in FIGS. 10 and 13. As illustrated in FIGS. 11A to 11E, the vertical length of each of the separation claws 16 in the vertical direction (thickness direction) of the two-ply sheet PJ gradually increases from the tip of each of the separation claws 16 near the center in the width direction of the two-ply sheet PJ, to the rear end of the separation claw 16 near the outsides in the width direction of the separation claw 16. Further, the separation claws 16 are movable in the width direction of the two-ply sheet PJ by a driving device 76 (see FIG. 13) controlled by the controller 500.

Figure 11A:
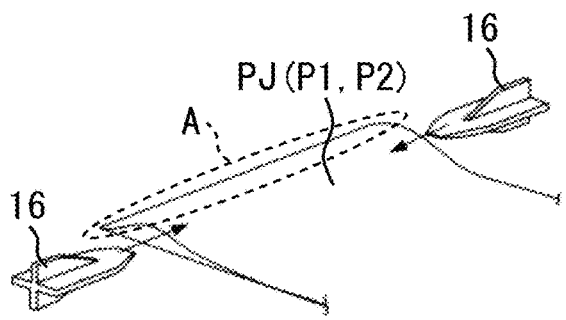
FIGS. 11A to 11E are perspective views, each illustrating the operation of the separation claws.
Figure 11B:
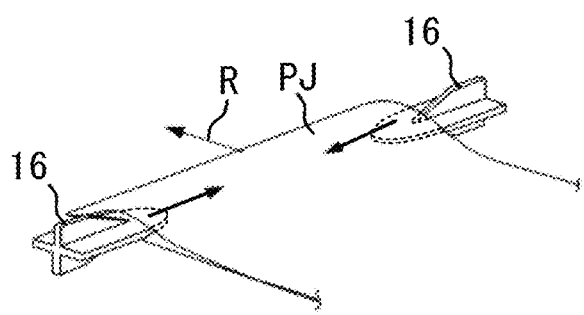

The separation claws 16 configured as described above ordinarily stand by at respective standby positions at which the separation claws 16 do not interfere with conveyance of the sheet such as the two-ply sheet PJ in the third sheet conveyance passage K3. As illustrated in FIG. 11A, the standby positions of the separation claws 16 are outside of the two-ply sheet PJ (including the first sheet P1 and the second sheet P2) in the width direction of the two-ply sheet PJ. Subsequently, as illustrated in FIGS. 10 and 11B, the separation claws 16 enter the gap C in the two-ply sheet PJ when separating the two-ply sheet PJ (including the first sheet P1 and the second sheet P2). As a result, the separation claws 16 secure the gap C to be relatively large.

As illustrated in FIG. 13, the driving device 76 that moves the pair of separation claws 16 in the width direction includes a motor 77, a gear pulley 78, a pulley 79, and a timing belt 80. The gear pulley 78 has a step-like ring shape including a gear and a pulley. The gear meshes with a motor gear mounted on a motor shaft of the motor 77. The pulley stretches and supports the timing belt 80 together with the pulley 79. One separation claw 16 of the pair of separation claws 16 includes a fixed portion 16a that is fixed to a part of the belt surface of the timing belt 80 that is the upper side of the belt surface in FIG. 13. The other separation claw 16 includes a fixed portion 16a that is fixed to a part of the other belt surface of the timing belt 80 that is the lower side of the belt surface in FIG. 13. As the driving device 76 as configured described above drives the motor 77 to rotate the motor shaft in a direction indicated by arrow in FIG. 13 (i.e., the clockwise direction), the gear pulley 78 rotates in the counterclockwise direction, so that the timing belt 80 rotates in the counterclockwise direction. Along with these rotations, the pair of separation claws 16 moves from the outsides in the width direction of the two-ply sheet PJ toward the center in the width direction of the two-ply sheet PJ (that is, the separation claws 16 approach each other). In contrast, when the motor 77 drives to rotate the motor shaft in the direction opposite to the arrow direction (i.e., the clockwise direction) in FIG. 13, the pair of separation claws 16 moves from the center portion in the width direction toward the outside portions in the width direction (that is, the separation claws 16 move in a direction away from each other).

In a state in which the separation claws 16 are inserted into the gap C in the two-ply sheet PJ, the separation claws 16 relatively move from the one end of the two-ply sheet PJ near the bonding portion A to the other end of the two-ply sheet PJ near the gripped portion B. Then, the separation claws 16 move in the width direction between the first sheet P1 and the second sheet P2 at the other end of the two-ply sheet PJ.

Figure 11C:
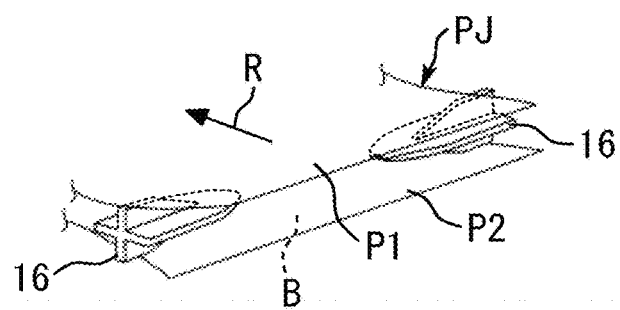
Figure 11D:
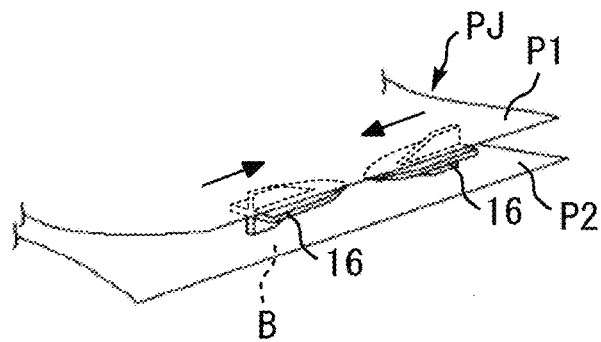

Specifically, the controller 500 controls the driving device 76 (see FIG. 13) to move the pair of separation claws 16 as follows. As illustrated in FIGS. 11B and 11C, the pair of separation claws 16 is inserted into both ends of the gap C in the two-ply sheet PJ in the width direction and relatively moves to the other end of the two-ply sheet PJ that is the gripped portion B. After the other end of the two-ply sheet PJ has passed the fixed portion 16a of the pair of separation claws 16, as illustrated in FIG. 11D, the pair of separation claws 16 on the other end of the two-ply sheet PJ moves in the width direction from both ends of the two-ply sheet PJ to the center of the two-ply sheet PJ between the first sheet P1 and the second sheet P2. In order to cause the pair of separation claws 16 to move as described above, the driving device 76 is configured so that the pair of separation claws 16 moves from the standby positions to the positions at which the separation claws 16 of the pair of separation claws 16 come close to each other.

The above-described mechanism, which includes the winding roller 20 to wind the two-ply sheet PJ and the separation claws 16 to be inserted into the two-ply sheet PJ so as to separate the two-ply sheet PJ, reduces the size of the sheet separation device 1, when compared with a mechanism using a large-scale device such as a vacuum device to separate the two-ply sheet PJ. That is, without increasing the size of the sheet separation device 1, the above-described mechanism reliably separates the first sheet P1 and the second sheet P2 constructing the two-ply sheet PJ.

In particular, since the separation claws 16 in the present embodiment move over substantially the entire region of the two-ply sheet PJ on the other end of the two-ply sheet PJ (that is the trailing end of the two-ply sheet PJ), the separation claws 16 sufficiently separate (in other words, peel) the other ends of the first sheet P1 and the second sheet P2 constructing the two-ply sheet PJ that is opposite the bonding portion A. Therefore, it is less likely that the above-described configuration causes an inconvenience that the other end of the two-ply sheet PJ that is opposite the bonding portion A is not sufficiently separated and the inner sheet PM (see FIG. 11E) would not be inserted into the other end of the two-ply sheet PJ from the other end of the two-ply sheet PJ. Additionally, the above-described configuration allows the separation claws 16 to easily function as a switcher, that is, to separately guide the first sheet P1 and the second sheet P2 to the first branched sheet conveyance passage K4 and the second branched sheet conveyance passage K5, respectively.

Figure 8A:
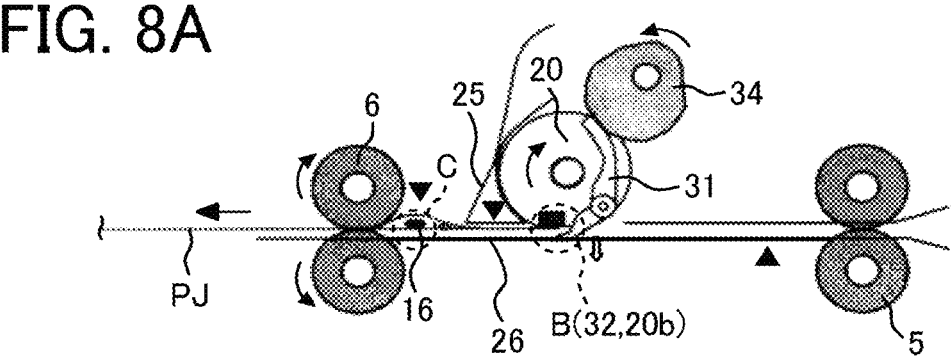
FIGS. 8A to 8C are schematic views, each illustrating the sheet separating operation performed in the sheet separation device, subsequent from the sheet separating operation of each of FIGS. 7A to 7C.
Figure 8B:
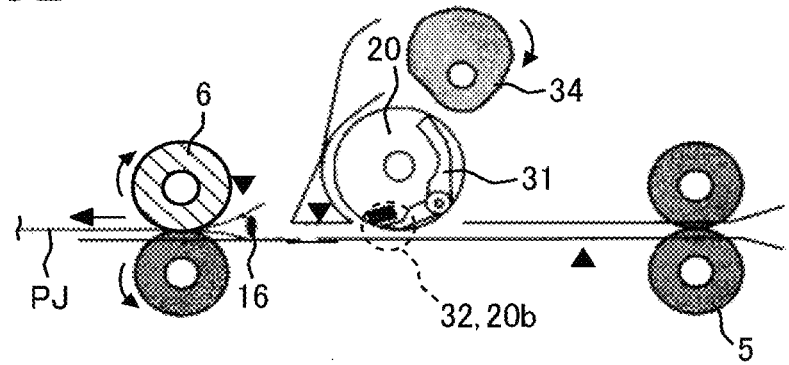
Figure 8C:
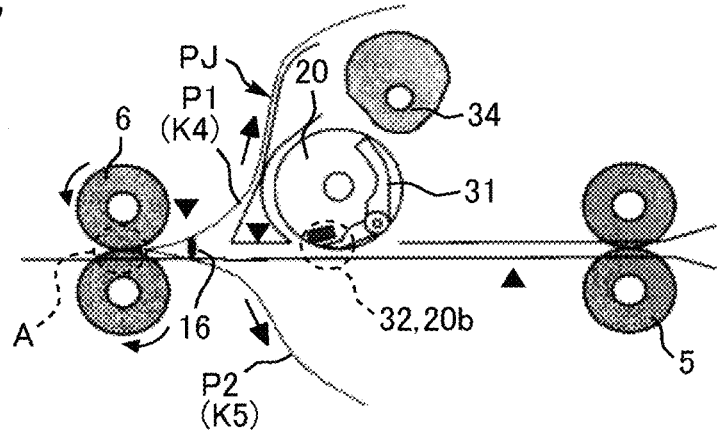

Here, a description is given of the separation claws 16 that functions as a switcher, with reference to FIGS. 8A to 8C.

In the present embodiment, the separation claws 16 that functions as a separator also function as a switcher that guides the first sheet P1 and the second sheet P2 separated by the separation claws 16, to the first branched sheet conveyance passage K4 and the second branched sheet conveyance passage K5 branching off in different directions, respectively.

To be more specific, as illustrated in FIG. 8C, the first branched sheet conveyance passage K4 and the second branched sheet conveyance passage K5 branch off in different directions from the third sheet conveyance passage K3 between the winding roller 20 and each of the separation claws 16 (separator). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 8A to 8C, after the separation claws 16 are inserted into the gap C, the third conveyance roller pair 6 conveys the one end of the two-ply sheet PJ to the left side in FIGS. 8A to 8C so that the winding of the other end of the two-ply sheet PJ on the winding roller 20 is released (see FIGS. 11A to FIG. 11C). After the winding of the other end of the two-ply sheet PJ on the winding roller 20 is released, the separation claws 16 move to the center in the width direction of the two-ply sheet PJ as illustrated in FIG. 11D, and stop at the center in the width direction of the two-ply sheet PJ. Then, while the separation claws 16 remain in the above-described state, the third conveyance roller pair 6 conveys the other end of the two-ply sheet PJ to the right side in FIGS. 8A to 8C again. Thereafter, the separation claws 16 guide the first sheet P1 and the second sheet P2 separated by the separation claws 16, to the first branched sheet conveyance passage K4 and the second branched sheet conveyance passage K5, respectively. That is, the first sheet P1 is guided to the first branched sheet conveyance passage K4, and the second sheet P2 is guided to the second branched sheet conveyance passage K5. Subsequently, as illustrated in FIGS. 9A to 9C and 11E, the separation claws 16 move to the standby positions, and the second conveyance roller pair 5 conveys the inner sheet PM to the one end of the third sheet conveyance passage K3, that is, the right side in FIGS. 9A to 9C, to insert the inner sheet PM between the first sheet P1 and the second sheet P2 separated from the two-ply sheet PJ.

As described above, each of the separation claws 16 in the present embodiment functions as a separator that separates (in other words, peels) the non-bonding portion of the two-ply sheet PJ configured by the first sheet P1 and the second sheet P2, and also functions as a switcher that separately guides the separated two sheets, which are the first sheet P1 and the second sheet P2, to the first branched sheet conveyance passage K4 and the second branched sheet conveyance passage K5, respectively. Accordingly, the above-described configuration reduces the size and cost of the sheet separation device 1, when compared with the configuration of a sheet separation device including the separator and the switcher as different units. That is, the above-described configuration efficiently and reliably separates the first sheet P1 and the second sheet P2 constructing the two-ply sheet PJ.

Note that each separation claw 16 in the present embodiment functions as both a separator and a switcher. However, the sheet separation device 1 according to the present embodiment may further include a member that functions as a switcher, different from the separation claw 16 that functions as a separator.

Here, a description is given of a first guide 25 provided in the sheet separation device 1 according to the present embodiment, with reference to FIGS. 7A to 7C.

The first guide 25 is disposed between the separation claws 16 and the winding roller 20 in the third sheet conveyance passage K3. The first guide 25 functions as a limiter to limit an amount of slack (in other words, a deflection amount) of the first sheet P1 that is wound around the winding roller 20 on the inner side of the first sheet P1 and the second sheet P2 of the two-ply sheet PJ wound around the winding roller 20.

To be more specific, the first guide 25 that functions as a limiter is a conveyance guide disposed on the side in which the winding roller 20 is disposed with respect to an imaginary plane S1, that is, above the imaginary plane S1 in FIG. 7A, in the third sheet conveyance passage K3. The imaginary plane S1 is an imaginary plane passing through the winding start position W of the winding roller 20 and the nip region of the third conveyance roller pair 6 in the third sheet conveyance passage K3 (see FIG. 7A). The first guide 25 has a shape like substantially a triangular prism having a plane along the outer circumferential surface of the winding roller 20, and the plane covers a part of the outer circumferential surface of the winding roller 20 and is separated from the winding roller 20 by a predetermined gap. The first guide 25 functions as a conveyance guide of the third sheet conveyance passage K3 and a conveyance guide of the first branched sheet conveyance passage K4. That is, the first guide 25 guides the sheet conveyed on the third sheet conveyance passage K3, the sheet conveyed on the first branched sheet conveyance passage K4, and the sheet wound around the winding roller 20.

In particular, in the third sheet conveyance passage K3, the first guide 25 limits bending the two-ply sheet PJ upward (in particular, bending the first sheet P1 upward) between the winding roller 20 and the third conveyance roller pair 6. Therefore, the gap C in the two-ply sheet PJ that is mainly formed by bending the first sheet P1 upward is intensively formed between the first guide 25 and the third conveyance roller pair 6. Accordingly, the above-described configuration increases the size of the gap C even if the winding amount of the two-ply sheet PJ wound around the winding roller 20 is not large, and the separation claws 16 smoothly enter the gap C to separate the two-ply sheet PJ.

Now, a description is given of a second guide 26 provided in the sheet separation device 1 according to the present embodiment, with reference to FIGS. 7A and 7C.

The second guide 26 is disposed between the separation claws 16 and the winding roller 20 in the third sheet conveyance passage K3. The second guide 26 functions as a guide to guide the second sheet P2 that is an outer sheet of the two sheets P1 and P2 of the two-ply sheet PJ wound around the winding roller 20.

To be more specific, the second guide 26 that functions as a guide is a sheet conveyance guide disposed on the side in which the winding roller 20 is not disposed with respect to the imaginary plane S1, that is, below the imaginary plane S1 in FIG. 7A, in the third sheet conveyance passage K3. The second guide 26 is disposed to face the lower surface of the sheet from a portion upstream from the second conveyance roller pair 5 in the forward direction to a portion downstream from the third conveyance roller pair 6 in the forward direction. That is, the second guide 26 guides the sheet conveyed on the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness is conveyed. Since this setting limits a gap between the first sheet P1 and the second sheet P2 of the two-ply sheet PJ so as not to be too large between the first guide 25 and the second guide 26, the gap C in the two-ply sheet PJ that is mainly formed by bending the first sheet P1 upward is intensively formed. Accordingly, the separation claws 16 smoothly enters the gap C to separate the two-ply sheet PJ.

Here, a description is given of the abnormality detection sensor 46, with reference to FIGS. 7A to 7C.

The abnormality detection sensor 46 functions as an abnormality detector to detect an abnormal state in which the gap C formed between the first sheet P1 and the second sheet P2 at a predetermined position (that is, a position between the third conveyance roller pair 6 and the winding roller 20) is not larger than a predetermined size before movements of the separation claws 16 from the standby positions (that is, movements from the standby positions illustrated in FIG. 13 to the separation positions illustrated in FIGS. 10 and 11A). The predetermined size is a size of the gap C into which the separation claws 16 enter and is determined by experiments. That is, the abnormality detection sensor 46 that functions as the abnormality detector detects the abnormal state in which the gap C formed between the first sheet P1 and the second sheet P2 at a predetermined position is not larger than the predetermined size before the separation claws 16 are inserted into the gap C.

In other words, at a timing at which the gap C is formed between the first sheet P1 and the second sheet P2, as illustrated in FIGS. 6D and 7A, the abnormality detection sensor 46 that functions as the abnormality detector detects the abnormal state such as a state in which the gap is not formed at all or a state in which the gap is not formed as a sufficient gap C.

In the present embodiment, the controller 500 notifies occurrence of an abnormal state when the abnormal state is detected by the abnormality detection sensor 46 that is the abnormality detector. To be more specific, as illustrated in FIG. 1, the sheet separation device 1 includes an operation display panel 49 that functions as an operation display device on the exterior of the sheet separation device 1 to display various kinds of information about the sheet separation device 1 and input various kinds of commands. When the controller 500 determines the abnormal state based on the results detected by the abnormality detection sensor 46, that is, when the two-ply sheet PJ does not have the sufficiently large gap C, the controller 500 controls the operation display panel 49 to display that the abnormal state is detected. For example, the operation display panel 49 displays "Since an abnormality has occurred, the process of inserting the inner sheet is stopped. Please check the setting direction of the two-ply sheet in the first feed tray. If the setting direction is correct and similar abnormalities are repeated, please contact a service person."

The above-described abnormality detection sensor 46 that functions as the abnormality detector device may be, for example, a lever type sensor that comes into contact with the upper first sheet P1 of the two-ply sheet PJ forming the gap C larger than the predetermined size.

Now, a description is given of the operations performed in the sheet separation device 1 to separate the two-ply sheet PJ, with reference to FIGS. 4 to 9C.

Further, in the description of the operations, the operations of the separation claws 16 are appropriately described with reference to FIGS. 10 to 11E, and the control flow is described with reference to a flowchart of FIG. 12, that is, FIGS. 12A and 12B.

Figure 4:
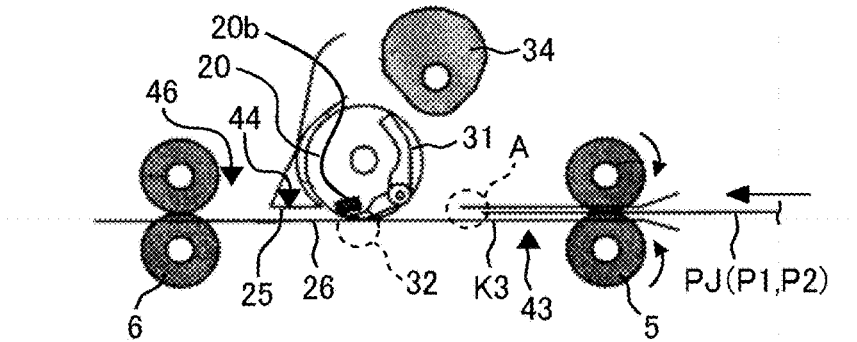
FIG. 4 is a schematic view illustrating a sheet separating operation performed in the sheet separation device illustrated in FIG. 1.
Figure 12A:
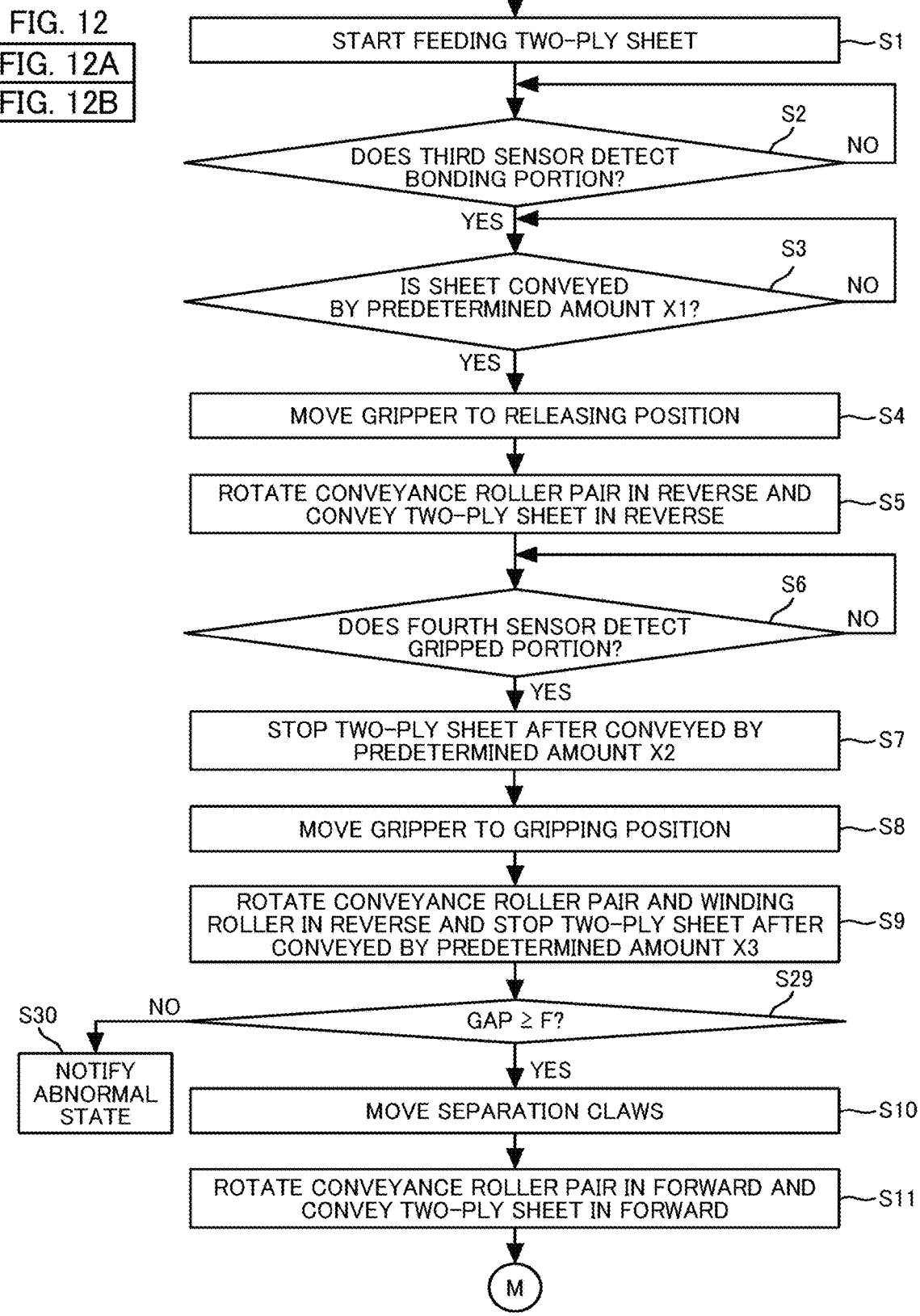
FIGS. 12A and 12B is a flowchart illustrating the control process executed in the sheet separation device.

First, the first feed roller 2 and the first conveyance roller pair 4 start feeding the two-ply sheet PJ from the first feed tray 11 in step S1 of FIG. 12A. Then, as illustrated in FIG. 4, the second conveyance roller pair 5 conveys the two-ply sheet PJ with the bonding portion A as a leading end of the two-ply sheet PJ in the forward direction that is a direction from the right side to the left side in FIG. 4 in the third sheet conveyance passage K3.

At this time, the controller 500 controls the moving mechanism 30 so that the gripper 32 is positioned at the gripping position. That is, the cam 34 moves to a rotational position at which the cam 34 does not push the arm 31. When the gripper 32 is positioned at the gripping position as described above, the gripper 32 does not interfere with the sheet conveyance in the third sheet conveyance passage K3. The separation claws 16 stand by at the standby positions (illustrated in FIG. 11A) at which the separation claws 16 do not interfere with the conveyance of the sheets in the third sheet conveyance passage K3. Further, the third conveyance roller pair 6 is stopped without rotating.

Then, as illustrated in FIG. 5A, the warp (slack) H1 is formed when the leading end (bonding portion A) of the two-ply sheet PJ contacts the nip region N formed by the third conveyance roller pair 6 in a state in which the third conveyance roller pair 6 is stopped without rotating. By so doing, the orientation of two-ply sheet PJ is deskewed, in other words, oblique sheet conveyance of the two-ply sheet PJ is corrected.

Then, as illustrated in FIG. 5B, after the leading end of the two-ply sheet PJ is deskewed, in other words, oblique sheet conveyance of the two-ply sheet PJ is corrected, the third conveyance roller pair 6 rotates in the forward direction to start conveyance of the two-ply sheet PJ to the left side in FIG. 5B while nipping the two-ply sheet PJ. At this time, the controller 500 determines whether the third sensor 43 detects the bonding portion A of the two-ply sheet PJ (that is the leading end of the two-ply sheet PJ conveyed in the forward direction, that is, the one end of the two-ply sheet PJ) in step S2 of FIG. 12A. The controller 500 uses a timing at which the third sensor 43 detects the bonding portion A as a trigger and, as illustrated in FIG. 5B, the controller 500 controls the third conveyance roller pair 6 to convey the two-ply sheet PJ in the forward direction by a predetermined amount X1 until the gripped portion B of the two-ply sheet PJ (that is the other end of the two-ply sheet PJ and the trailing end of the two-ply sheet PJ conveyed in the forward direction) passes through the position of the winding roller 20 in step S3 of FIG. 12A.

As illustrated in FIG. 5C, the controller 500 temporarily stops the third conveyance roller pair 6 to stop conveyance of the two-ply sheet PJ conveyed by the predetermined amount X1 and controls the gripper 32 to move from the gripping position to the releasing position in step S4 of FIG. 12A. That is, the cam 34 moves to a rotational position at which the cam 34 pushes the arm 31. In this state, the gripped portion B of the two-ply sheet PJ is received between the gripper 32 and the receiving portion 20b.

Then, as illustrated in FIG. 5D, the third conveyance roller pair 6 rotates in the reverse direction to start conveyance of the two-ply sheet PJ in the reverse direction in step S5 of FIG. 12A. At this time, the fourth sensor 44 detects the gripped portion B of the two-ply sheet PJ, that is, the other end of the two-ply sheet PJ and the leading end of the two-ply sheet PJ conveyed in the reverse direction.

Subsequently, as illustrated in FIG. 6A, the controller 500 uses the timing at which the fourth sensor 44 detects the gripped portion B of the two-ply sheet PJ as a trigger in step S6 of FIG. 12A, and stops conveyance of the two-ply sheet PJ in step S7 of FIG. 12A at a timing at which the third conveyance roller pair 6 conveys the two-ply sheet PJ by a predetermined amount X2 that is a timing at which the gripped portion B of the two-ply sheet PJ reaches the position of the winding roller 20, that is, the winding start position W.

After the gripped portion B reaches the winding start position W, as illustrated in FIG. 6B, the gripper 32 is moved from the releasing position to the gripping position in step S8 of FIG. 12A. That is, the cam 34 moves to a rotational position at which the cam 34 does not push the arm 31. In step S8, as illustrated in FIG. 6B', the end surface of the other end of the two-ply sheet PJ does not contact any member, and the gripped portion B is gripped between the gripper 32 and the receiving portion 20b.

Then, as illustrated in FIG. 6C, the winding roller 20 rotates in the reverse direction (that is, the counterclockwise direction) in a state in which the gripper 32 grips the two-ply sheet PJ, and the third conveyance roller pair 6 rotates again in the reverse direction together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 6D. At this time, as the gap C is formed, the first guide 25 and the second guide 26 limit the warp (slack) of the two-ply sheet PJ in the vicinity of the winding roller 20. Accordingly, the gap C of the two-ply sheet PJ is intensively formed near the third conveyance roller pair 6.

Since the controller 500 uses the timing at which the fourth sensor 44 disposed downstream from the third conveyance roller pair 6 in the reverse direction detects the leading end of the two-ply sheet PJ conveyed in the reverse direction as the trigger to determine the timing at which the gripper 32 and the receiving portion 20b grip the gripped portion B of the two-ply sheet PJ, the gripped portion B of the two-ply sheet PJ is accurately conveyed to a desired gripping position regardless of variations in the sheet lengths with respect to the sheet conveyance amount X2. Note that the size of sheets includes an error even if the sheets are sold as the same size.

The fourth sensor 44 is capable of reducing the sheet conveyance amount X2 that is measured since the fourth sensor 44 detects the leading end of the two-ply sheet PJ conveyed in the reverse direction, regardless of the sheet length. Therefore, the above-described configuration reduces variation in the sheet conveyance amount X2 and accurately conveys the gripped portion B of the two-ply sheet PJ to the desired gripping position.

Accordingly, the fourth sensor 44 is preferably disposed near the winding roller 20.

Further, a description is given of a mechanism that generates the gap C in the two-ply sheet PJ, with reference to FIG. 6C'. That is, the gap C is generated in the two-ply sheet PJ between the winding roller 20 and the third conveyance roller pair 6 by winding the two-ply sheet PJ around the winding roller 20.

The following description additionally indicates the mechanism.

The two-ply sheet PJ wound around the winding roller 20 is gripped by the gripper 32, restricting misalignment in the sheet. Therefore, a slip is generated between the first sheet P1 and the second sheet P2 by the amount of the circumferential length of the winding roller 20. As a result, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 one or more rounds, the difference in the winding circumferential length is generated between the inner circumference and the outer circumference additionally by the thickness of the sheet, which generates the warp (slack).

To be more specific, a distance from the rotary shaft 20a (i.e., the axial center) of the winding roller 20 to the second sheet P2 on the outer side of the winding roller 20 is $R+\Delta R$, where a distance from the rotary shaft 20a (i.e., the axial center) of the winding roller 20 to the first sheet P1 on the inner side of the winding roller 20 is "R" and the thickness of the inner sheet (first sheet P1) is "$\Delta R$." Since the radius of the first sheet P1 wound around the inner side of the winding roller 20 and the radius of the second sheet P2 wound around the outer side of the first sheet P1 are different by the thickness $\Delta R$ of the first sheet P1 (wound around the inner side of the winding roller 20), a circumferential length difference obtained by $2 \times \Delta R \times \pi$ is generated between the inner sheet (first sheet P1) and the outer sheet (second sheet P2), when the two-ply sheet PJ is wound around the winding roller 20 by one round. Therefore, when the number of winding the two-ply sheet PJ around the winding roller 20 is M times, the slack of the inner sheet (first sheet P1) is generated by the circumferential length difference obtained by $2 \times \Delta R \times \pi \times M$.

Finally, the warp (slack) is accumulated between the third conveyance roller pair 6 and the winding roller 20, and the gap C corresponding to $2 \times \Delta R \times \pi \times M$ is formed between the first sheet P1 and the second sheet P2.

In step S9 of FIG. 12A, after the winding roller 20 starts the winding of the two-ply sheet PJ, as illustrated in FIG. 7A, the third conveyance roller pair 6 stops conveyance of the two-ply sheet PJ and the winding roller 20 stops the winding of the two-ply sheet PJ at the timing at which the third conveyance roller pair 6 conveys the two-ply sheet by a predetermined amount X3. In this state, the two-ply sheet PJ is wound around the winding roller 20 one or more times, and the gap C in the two-ply sheet PJ (i.e., the distance between the first sheet P1 and the second sheet P2) is sufficiently widened if the two-ply sheet PJ is normally separated.

When the gap C is widened, the controller 500 determines whether the abnormality detection sensor 46 detects that the gap C equal to or larger than a predetermined distance F is formed in the two-ply sheet PJ, in step S29 of FIG. 12A.

As a result, when the controller 500 determines that the gap C is the sufficiently large gap equal to or larger than the predetermined size F, the controller 500 determines that the subsequent sheet separating operations of the separation claws 16 do not cause a problem and controls the separation claws 16 to insert into the gap C sufficiently widened in the two-ply sheet PJ, as illustrated in FIG. 7B, in step S10 of FIG. 12A. That is, as illustrated in FIGS. 10 and 11A, each of the separation claws 16 in pair is moved from the standby position to the separation position.

Then, as illustrated in FIG. 7C, the third conveyance roller pair 6 and the winding roller 20 start rotating in the forward direction, that is, in the clockwise direction, in step S11 of FIG. 12A, after the separation claws 16 are inserted into the gap C. That is, as illustrated in FIGS. 11A to 11C, the separation claws 16 that is inserted into the gap C of the two-ply sheet PJ relatively move from the one end (bonding portion A) to the other end (gripped portion B) with respect to the two-ply sheet PJ. Note that the above-described relative movement in the present embodiment is achieved by moving the two-ply sheet PJ itself in a direction indicated by arrow in FIGS. 11A to 11C without changing the positions of the separation claws 16 in the sheet conveyance direction.

Figure 12B:
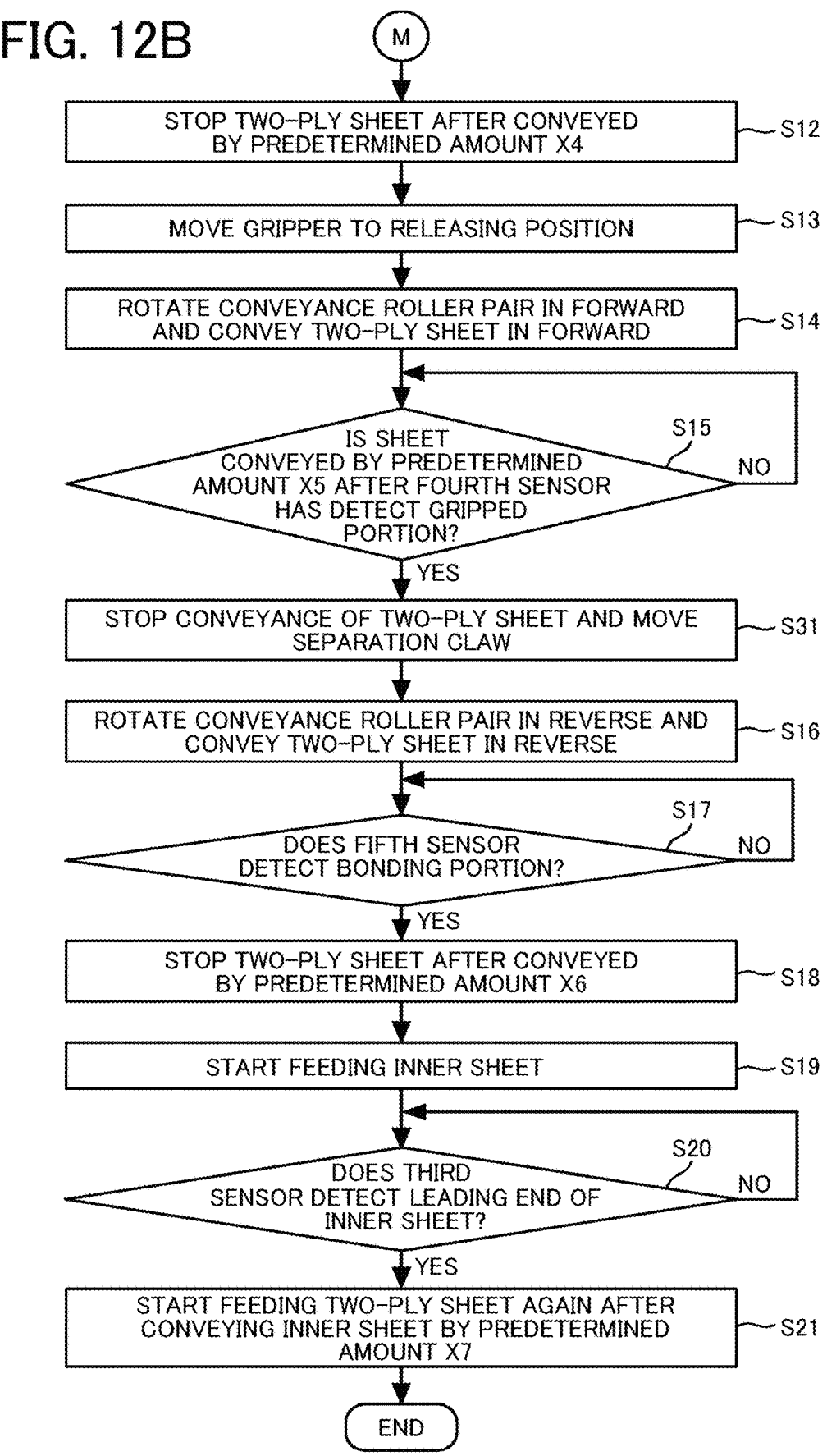

In step S12 of FIG. 12B, as illustrated in FIG. 8A, the controller 500 stops the forward rotation of the third conveyance roller pair 6 and the forward rotation of the winding roller 20 after the forward rotation of the third conveyance roller pair 6 conveys the two-ply sheet PJ by a predetermined amount X4. At this time, the gripped portion B of the two-ply sheet PJ is positioned on the third sheet conveyance passage K3 (that is, at the winding start position W illustrated in FIG. 6B), and the gripper 32 can release the gripped portion B. In addition, as illustrated in FIG. 11C, the separation claws 16 stop near the other end of the two-ply sheet PJ after the separation claws 16 are inserted into the gap C of the two-ply sheet PJ and relatively move to the other end (gripped portion B) of the two-ply sheet PJ with respect to the two-ply sheet PJ.

In this state, the gripper 32 moves from the gripping position to the releasing position in step S13 of FIG. 12B. That is, the cam 34 moves to a rotational position at which the cam 34 does not push the arm 31. This state indicates that the gripper 32 releases the two-ply sheet PJ from the gripping. Note that, in the present embodiment, the cam 34 in the moving mechanism 30 moves to release the gripping of the gripper 32. However, the third conveyance roller pair 6 may pull the two-ply sheet PJ from the gripper 32 to release the gripping and convey the two-ply sheet without the above-described movement of the cam 34 in the moving mechanism 30 when the pulling force due to the conveyance of the third conveyance roller pair 6 is larger than the gripping force of the gripper 32 that grips the two-ply sheet PJ.

Thereafter, in step S14 of FIG. 12B, as illustrated in FIG. 8B, the third conveyance roller pair 6 rotates in the forward direction again to start conveyance of the two-ply sheet PJ in the forward direction. In addition, after the gripped portion B of the two-ply sheet PJ, that is, the other end of the two-ply sheet PJ and the trailing end of the two-ply sheet PJ, passes over the branch portion between the third sheet conveyance passage K3 and each of the first branched sheet conveyance passage K4 and the second branched sheet conveyance passage K5, the gripper 32 moves from the releasing position to the gripping position. Further, at this time, the fourth sensor 44 detects the gripped portion B of the two-ply sheet PJ, that is, the other end of the two-ply sheet PJ and the trailing end of the two-ply sheet PJ conveyed in the forward direction. The controller 500 determines whether the third conveyance roller pair 6 conveys the two-ply sheet PJ by a predetermined amount X5 after the timing, as a trigger, at which the fourth sensor 44 detects the trailing end of the two-ply sheet PJ conveyed in the forward direction in step S15 of FIG. 12B. Then, the third conveyance roller pair 6 conveys the two-ply sheet PJ by a predetermined amount X5 and then stops the conveyance of the two-ply sheet PJ. In step S31 of FIG. 12B, the separation claws 16 move in the width direction, as illustrated in FIG. 11D. As a result, as illustrated in FIG. 8B, the trailing ends of the first sheet P1 and the second sheet P2 of the two-ply sheet PJ conveyed in the forward direction are separated and largely opened (see FIG. 11D).

Then, as illustrated in FIG. 8C, the third conveyance roller pair 6 rotates in the reverse direction to start conveyance of the two-ply sheet PJ in the reverse direction, in step S16 of FIG. 12B. At this time, since the separation claws 16 are disposed at the switching positions at which the separation claws 16 block the two-ply sheet PJ moving to the third sheet conveyance passage K3 (that is, the position illustrated in FIG. 11D), the first sheet P1 and the second sheet P2 separated each other are guided to the first branched sheet conveyance passage K4 and the second branched sheet conveyance passage K5, respectively, as illustrated in FIG. 8C. At this time, the fifth sensor 45 (see FIG. 1) detects the bonding portion A of the two-ply sheet PJ, that is, the one end of the two-ply sheet PJ and the trailing end of the two-ply sheet PJ conveyed in the reverse direction.

Subsequently, as illustrated in FIG. 9A, the controller 500 uses the timing at which the fifth sensor 45 (see FIG. 1) detects the trailing end of the two-ply sheet PJ conveyed in the reverse direction, that is, the bonding portion A, as a trigger, in step S17 of FIG. 12B. Then, the controller 500 stops the conveyance of the two-ply sheet PJ at a timing at which the third conveyance roller pair 6 conveys the two-ply sheet PJ by a predetermined amount X6, in step S18 of FIG. 12B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region. That is, the third conveyance roller pair 6 nips the one end of the two-ply sheet PJ.

Subsequently, as illustrated in FIG. 9A, the second conveyance roller pair 5 starts feeding the inner sheet PM from the second feed tray 12 (see FIG. 1) in step S19 of FIG. 12B. At this time, the third sensor 43 detects the leading end of the inner sheet PM conveyed in the forward direction that is also referred to as the one end of the inner sheet PM. In addition, as illustrated in FIG. 9B, the separation claws 16 move to the respective standby positions.

Figure 9C:
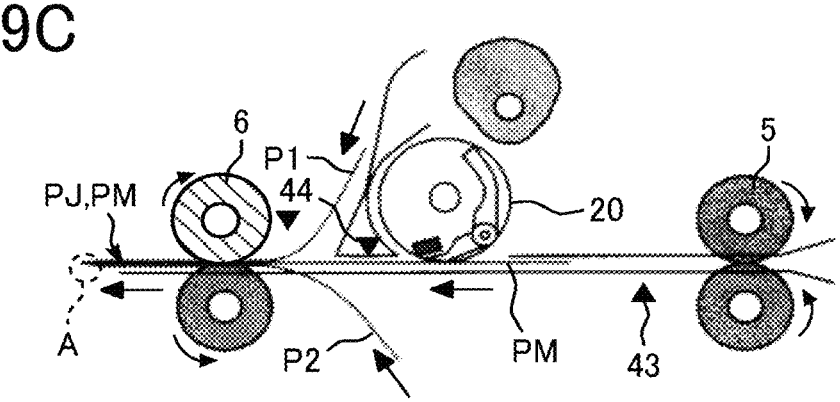
Figure 11E:
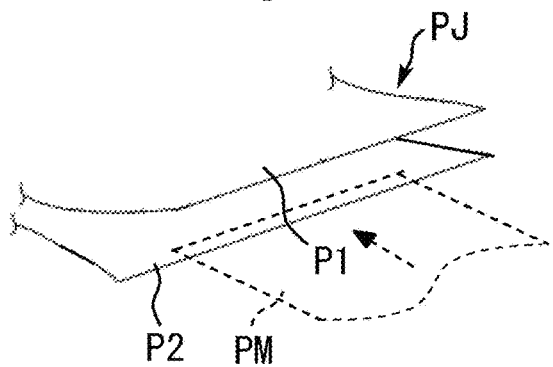

Subsequently, as illustrated in FIGS. 9C and 11E, the controller 500 uses the timing at which the third sensor 43 detects the leading end of the inner sheet PM, as a trigger, in step S20 of FIG. 12B. After the third sensor 43 has detected the leading end of the inner sheet PM, the second conveyance roller pair 5 conveys the inner sheet PM by a predetermined amount X7. Then, the third conveyance roller pair 6 starts the conveyance of the two-ply sheet PJ in the forward direction again, in step S21 of FIG. 12B.

At this time, in a state in which the third conveyance roller pair 6 is stopped without rotating, the leading end of the inner sheet PM contacts (hits) the nip region of the third conveyance roller pair 6 by which the separated two-ply sheet PJ is nipped, so that a warp (slack) H2 is generated. By forming the warp (slack) H2, the orientation of the inner sheet PM is deskewed (see FIGS. 9B and 16B).

Thus, the controller 500 finishes the operations to insert the inner sheet PM between the first sheet P1 and the second sheet P2 in the two-ply sheet PJ. The third conveyance roller pair 6 conveys the two-ply sheet PJ in the forward direction, and the two-ply sheet PJ is ejected and placed on the ejection tray 13 in a state in which the inner sheet PM is inserted into the two-ply sheet PJ (see FIG. 1).

In contrast, when the controller 500 determines that the gap C in the two-ply sheet PJ is not the sufficiently large gap equal to or larger than the predetermined distance F, in step S29 of FIG. 12A, that is, when the controller 500 determines that the abnormal state occurs based on the results detected by the abnormality detection sensor 46, the controller 500 determines that the subsequent sheet separating operations of the separation claws 16 cause various kinds of problems, and therefore does not move the separation claws 16 from the standby positions to the separation positions. At this time, the controller 500 controls the operation display panel 49 (see FIG. 1) to notify that the occurrence of the abnormal state stops the sheet separating operation of the two-ply sheet PJ and the sheet inserting operation of the inner sheet PM, in step S30 of FIG. 12A.

Variation 1

Figure 17:
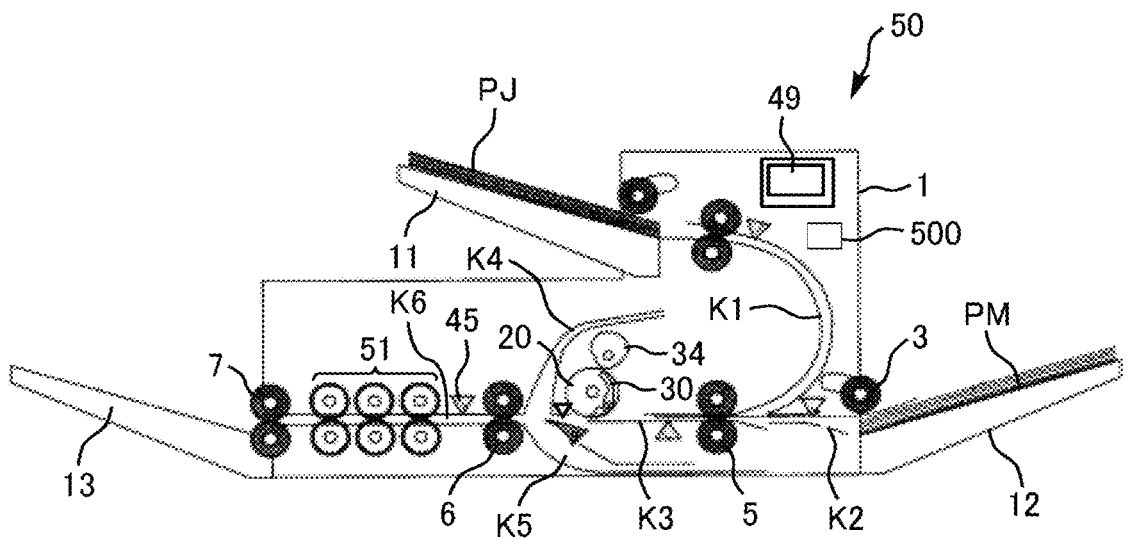
FIG. 17 is a schematic view illustrating a sheet laminator according to Variation 1.

Next, a description is given of a sheet laminator according to Variation 1, with reference to FIG. 17.

As illustrated in FIG. 17, a sheet laminator 50 according to Variation 1 includes the sheet separation device 1 illustrated in FIG. 1.

The sheet laminator 50 includes a sheet lamination device 51 disposed downstream from the third conveyance roller pair 6 in the sheet separation device 1 in the forward direction. The sheet lamination device 51 performs a sheet laminating operation on the two-ply sheet PJ (that is, the normally processed two-ply sheet PJ) in which the inner sheet PM is inserted between the first sheet P1 and the second sheet P2 separated by the sheet separation device 1.

The sheet lamination device 51 includes a plurality of heat and pressure roller pairs, each of which applies heat and pressure to the two-ply sheet PJ while conveying the two-ply sheet PJ in the forward direction with the inner sheet PM being inserted in the two-ply sheet PJ. Further, a fourth sheet conveyance passage K6 is disposed between the third conveyance roller pair 6 and the sheet lamination device 51.

As described above with reference to FIGS. 4 to 9C, the two-ply sheet PJ (in which the inner sheet PM has been inserted after the sheet separating operation) passes through the fourth sheet conveyance passage K6 and is conveyed to the sheet lamination device 51. After the two-ply sheet PJ in which the inner sheet PM is inserted passes through the sheet lamination device 51, the entire region of the two-ply sheet PJ is bonded. Then, the two-ply sheet PJ on which the sheet laminating operation is performed as described above is ejected to the outside of the sheet lamination device 51 by an ejection roller pair 7 and is stacked on the ejection tray 13.

As described above, the sheet laminator 50 according to Variation 1 executes the laminating process as a sequence of the following operations: an operation to feed the two-ply sheet PJ and the inner sheet PM; an operation to separate the first sheet P1 and the second sheet P2 of the two-ply sheet PJ; an operation to insert the inner sheet PM into the space between the first sheet P1 and the second sheet P2; and an operation to perform the laminating process on the two-ply sheet PJ inside which the inner sheet PM is inserted. By so doing, the user convenience for the sheet laminator 50 is enhanced.

Note that the sheet laminator 50 includes the operation display panel 49. When the controller 500 determines that the abnormal state occurs based on the results detected by the abnormality detection sensor 46, the controller 500 controls the operation display panel 49 to display that the occurrence of the abnormal state stops the sheet separating operation of the two-ply sheet PJ and the sheet inserting operation of the inner sheet PM.

Further, when the sheet laminating operation is not performed, another sheet conveyance passage may be branched from the fourth sheet conveyance passage K6 between the sheet lamination device 51 of the fourth sheet conveyance passage K6 and the fifth sensor 45 and be merged with the fourth sheet conveyance passage K6 between the sheet lamination device 51 of the fourth sheet conveyance passage K6 and the ejection roller pair 7, so that the inner sheet PM detours the sheet lamination device 51 and is ejected to the ejection tray 13.

Variation 2

Figure 18:
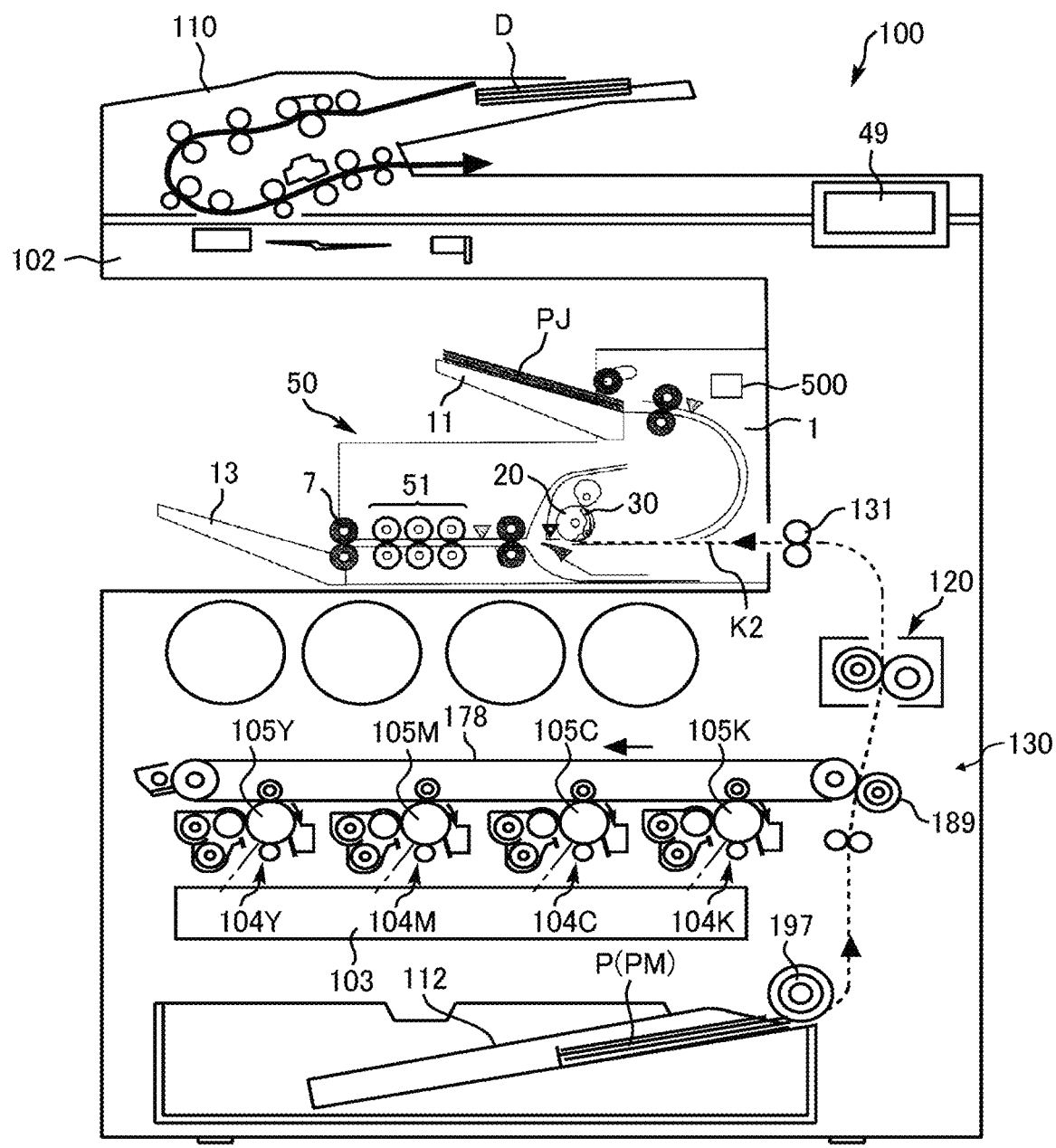
FIG. 18 is a schematic view illustrating an image forming apparatus according to Variation 2.

A description is given of an image forming apparatus according to Variation 2, with reference to FIG. 18.

As illustrated in FIG. 18, an image forming apparatus 100 according to Variation 2 that forms an image on a sheet P includes the sheet laminator 50 illustrated in FIG. 17, in an image forming device 130 provided in the image forming apparatus 100. However, the sheet laminator 50 provided in the image forming apparatus 100 according to Variation 2 does not include the second feed tray 12 and the second feed roller 3, which is different from the sheet laminator 50 illustrated in FIG. 17. That is, in the sheet laminator 50 of Variation 2, the inner sheet PM is conveyed from the image forming apparatus 100 to the second sheet conveyance passage K2.

With reference to FIG. 18, in the image forming apparatus 100, multiple pairs of sheet conveying rollers disposed in a document feeder 110 feed an original document D from a document loading table and convey the original document D in a direction indicated by arrow in FIG. 18. By so doing, the original document D passes over a document reading device 102. At this time, the document reading device 102 optically reads image data of the original document D passing over the document reading device 102.

The image data optically read by the document reading device 102 is converted into electrical signals and transmitted to a writing device 103. The writing device 103 emits laser beams onto photoconductor drums 105Y, 105M, 105C, and 105K, based on the electrical signals of the image data in each of colors, respectively. By so doing, an exposure process is executed by the writing device 103.

On the photoconductor drums 105Y, 105M, 105C, and 105K of respective image forming units 104Y, 104M, 104C, and 104K, a charging process, the exposure process, and a developing process are executed to form desired images on the photoconductor drums 105Y, 105M, 105C, and 105K, respectively.

The images formed on the photoconductor drums 105Y, 105M, 105C, and 105K are transferred and superimposed onto an intermediate transfer belt 178 to form a color image. The color image formed on the intermediate transfer belt 178 is transferred onto the surface of a sheet P (which is a sheet to function as the inner sheet PM) fed and conveyed by a feed roller 197 from a feeding device 112 at a position at which the intermediate transfer belt 178 faces a secondary transfer roller 189.

After the color image is transferred onto the surface of the sheet P (that is, the inner sheet PM), the sheet P is conveyed to the position of a fixing device 120. The fixing device 120 fixes the transferred color image on the sheet P.

Thereafter, the sheet P is ejected from the image forming device 130 of the image forming apparatus 100 by an ejection roller pair 131, and is fed as the inner sheet PM, into the sheet laminator 50. At this time, when the sheet laminator 50 including the sheet separation device 1 receives the inner sheet PM, the sheet laminator 50 has completed the operation described with reference to FIGS. 4A to 8C (that is, the operation to separate the two-ply sheet PJ) and performs the operation described with reference to FIGS. 9A to 9C (that is, the operation to insert the inner sheet PM into the two-ply sheet PJ) after the sheet laminator 50 (including the sheet separation device 1) receives the inner sheet PM. Further, after the sheet lamination device 51 has completed the sheet laminating operation on the two-ply sheet PJ in which the inner sheet PM is inserted, the ejection roller pair 7 ejects the two-ply sheet PJ to the outside of the sheet lamination device 51 to stack the two-ply sheet PJ on the ejection tray 13.

As described above, a series of image formation process (i.e., the printing operations) in the image forming apparatus 100 and a series of sheet separation process of the two-ply sheet PJ and the laminating process of the inner sheet PM on which the image is formed are completed.

Note that, in Variation 2, the image forming apparatus 100 includes the sheet laminator 50 but may include the sheet separation device 1 illustrated in FIG. 1.

Further, the image forming apparatus 100 includes the operation display panel 49. When the controller 500 determines that the abnormal state occurs based on the results detected by the abnormality detection sensor 46, the controller 500 controls the operation display panel 49 to display that the occurrence of the abnormal state stops the sheet separating operation of the two-ply sheet PJ and the sheet inserting operation of the inner sheet PM.

Further, the image forming apparatus 100 according to Variation 2 of the present disclosure is a color image forming apparatus but may be a monochrome image forming apparatus. Further, the image forming apparatus 100 according to Variation 2 of the present disclosure employs electrophotography, but the present disclosure is not limited to an electrophotographic image forming apparatus. For example, the present disclosure may be applied to other types of image forming apparatuses such as an inkjet image forming apparatus and a stencil printing machine.

Variation 3

Figure 19:
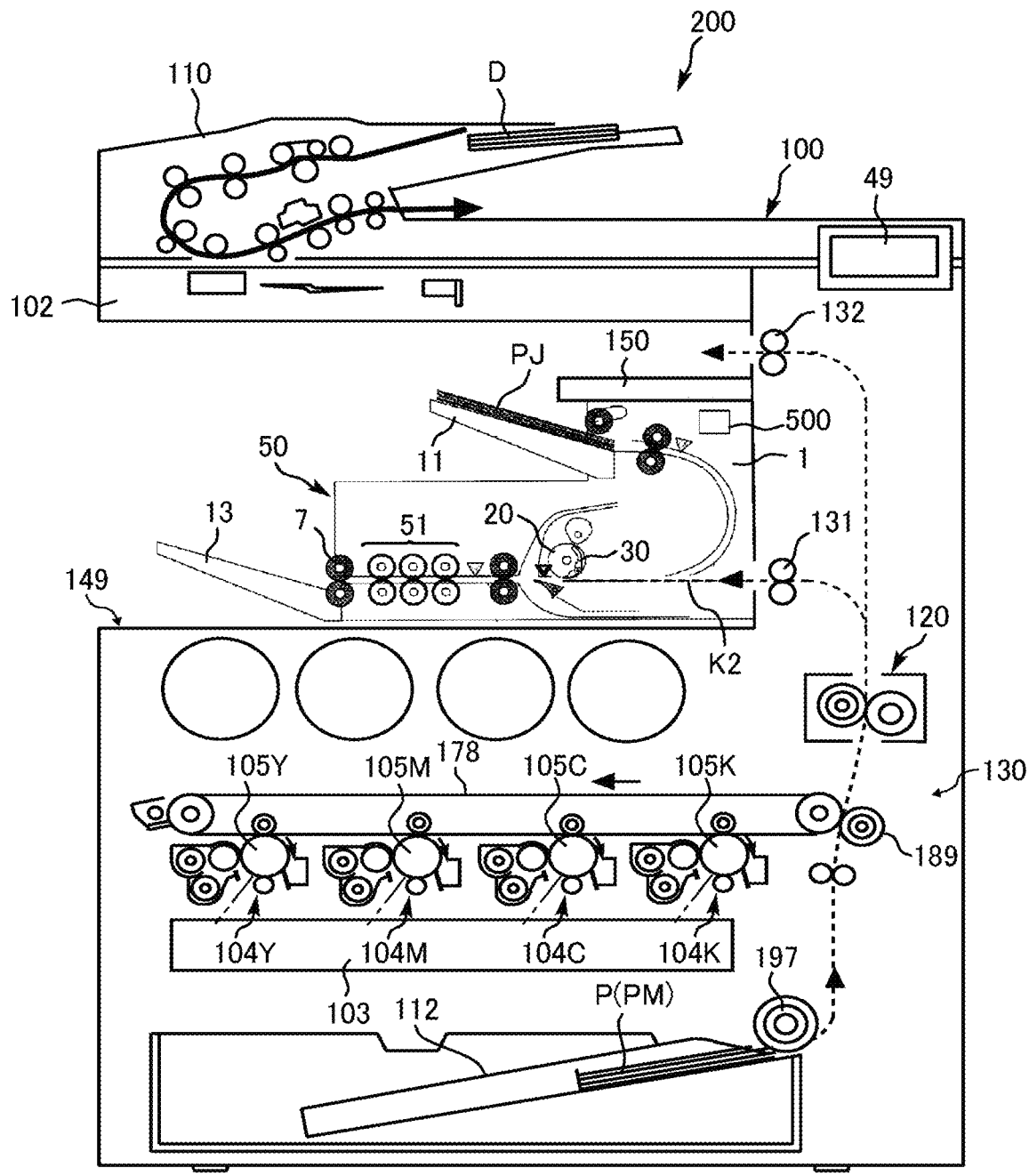
FIG. 19 is a schematic view illustrating an image forming system according to Variation 3.

A description is given of an image forming system according to Variation 3, with reference to FIG. 19.

As illustrated in FIG. 19, an image forming system 200 according to Variation 3 includes the image forming apparatus 100 illustrated in FIG. 18 that forms an image on a sheet P, and the sheet laminator 50 illustrated in FIG. 17 that is detachably attached to the image forming apparatus 100. However, the sheet laminator 50 provided in the image forming system 200 according to Variation 3 does not include the second feed tray 12 and the second feed roller 3, which is different from the sheet laminator 50 illustrated in FIG. 17. That is, in the sheet laminator 50 of Variation 3, the inner sheet PM is conveyed from the image forming apparatus 100 to the second sheet conveyance passage K2.

In the image forming system 200 illustrated in FIG. 19, the image forming apparatus 100 executes the image forming process on the sheet P, as described above with reference to FIG. 17. Then, the image forming apparatus 100 ejects the sheet P (that is, the inner sheet PM on which a desired image is formed) from the ejection roller pair 131 to the sheet laminator 50. Then, after the sheet P is conveyed to the sheet laminator 50, the sheet P is inserted into the two-ply sheet PJ, where the sheet laminator 50 performs the sheet laminating operation on the two-ply sheet PJ. Then, the ejection roller pair 7 ejects the two-ply sheet PJ to the outside of the sheet laminator 50 to stack the two-ply sheet PJ on the ejection tray 13.

When such a sheet laminating operation is not performed, the image forming apparatus 100 in the image forming system 200 ejects the sheet P having the image formed in the image forming process, from a second ejection roller pair 132 to the outside of the image forming apparatus 100, so as to stack the sheet P on a second ejection tray 150.

The sheet laminator 50 is detachably attached to the image forming apparatus 100. When the sheet laminator 50 is not used, the sheet laminator 50 may be detached from the image forming apparatus 100. In a case in which the sheet laminator 50 is removed from the image forming apparatus 100, a placement surface 149 on which the sheet laminator 50 was installed functions as an ejection tray, and the sheet P that is ejected from the ejection roller pair 131 to the outside of the image forming apparatus 100 is stacked on the placement surface 149, in other words, the sheet P on which a desired image is formed is stacked on the placement surface 149.

Note that, in Variation 3, the sheet laminator 50 is detachably attached to the image forming system 200. However, the sheet separation device 1 illustrated in FIG. 1 may be detachably attached to the image forming system 200.

Further, the image forming system 200 includes the operation display panel 49. When the controller 500 determines that the abnormal state occurs based on the results detected by the abnormality detection sensor 46, the controller 500 controls the operation display panel 49 to display that the occurrence of the abnormal state stops the sheet separating operation of the two-ply sheet PJ and the sheet inserting operation of the inner sheet PM.

As described above, the sheet separation device 1 according to the present embodiment separates the non-bonding portion of the two-ply sheet PJ in which the first sheet P1 and the second sheet P2 are overlapped and bonded at one end as the bonding portion A. The sheet separation device 1 includes the third conveyance roller pair 6 (sheet conveyance roller pair) that conveys the two-ply sheet PJ in a state in which the third conveyance roller pair 6 nips the two-ply sheet PJ when separating the non-bonding portion of the two-ply sheet PJ. Then, the leading end of the two-ply sheet PJ conveyed toward the third conveyance roller pair 6 in the sheet conveyance direction contacts the nip region of the third conveyance roller pair 6 in a state in which the third conveyance roller pair 6 is stopped without rotating. Thereafter, the third conveyance roller pair 6 starts rotating and grips the two-ply sheet PJ.

By so doing, the inner sheet PM is inserted into the two-ply sheet PJ at with high positional accuracy.

Note that, in the present embodiment, the first branched sheet conveyance passage K4 and the second branched sheet conveyance passage K5 branch off in different directions from the third sheet conveyance passage K3 (sheet conveyance passage) between the separation claws 16 each functioning as a separator and the winding roller 20. By contrast, the first branched sheet conveyance passage K4 and the second branched sheet conveyance passage K5 may branch off at the position of the separation claws 16 (each functioning as a separator) in different directions from the third sheet conveyance passage K3 (sheet conveyance passage), resulting that the third sheet conveyance passage K3 is nipped by the first branched sheet conveyance passage K4 and the second branched sheet conveyance passage K5.

Further, in the present embodiment, the first branched sheet conveyance passage K4 and the second branched sheet conveyance passage K5 are formed in a substantially U shape extending from the branch portion to the right side of FIG. 1. However, the shape of the first branched sheet conveyance passage K4 and the second branched sheet conveyance passage K5 is not limited to the above-described U shape. For example, the first branched sheet conveyance passage K4 and the second branched sheet conveyance passage K5 may be formed in a substantially U shape extending from the branch portion to the left in FIG. 1 or may be formed in a substantially S shape extending from the branch portion to both the left and right in FIG. 1.

Further, even when the above-described sheet separation devices are applied, these sheet separation devices can achieve the same effect as the effect provided by the configuration(s) in the present embodiment.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set.

In the present disclosure, the "end surface" of the two-ply sheet is defined as a side surface extending in the thickness direction and connecting the front surface and the back surface of the two-ply sheet. Accordingly, there are four end surfaces of the rectangular two-ply sheet on the front, back, left, and right.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet separation device configured to separate a non-bonding portion of a two-ply sheet in which two sheets are overlapped and bonded together at one end as a bonding portion of the two-ply sheet, the sheet separation device comprising:
    a conveyance roller pair to convey the two-ply sheet while nipping the two-ply sheet, when separating the non-bonding portion of the two-ply sheet; and
    a controller configured to control sheet conveyance and correct skew of the two-ply sheet,
    the controller being configured to:
        stop the conveyance roller pair;
        cause a leading end of the two-ply sheet conveyed toward the conveyance roller pair to contact a nip region of the conveyance roller pair while the conveyance roller pair is stopped so as to correct the skew of the two-ply sheet; and
        start the conveyance roller pair to rotate to nip the two-ply sheet.

2. The sheet separation device according to claim 1, wherein the controller is configured to:
    cause the conveyance roller pair to nip the one end of the two-ply sheet with the non-bonding portion being separated;
    stop the conveyance roller pair in a state in which the one end of the two-ply sheet is nipped by the conveyance roller pair with the non-bonding portion being separated;
    cause one end of an inner sheet to contact the conveyance roller pair;
    convey the inner sheet toward the one end of the two-ply sheet via the non-bonding portion between the two sheets separated from each other to insert the inner sheet between the two sheets of the two-ply sheet; and
    start the conveyance roller pair to rotate to convey the two-ply sheet in which the inner sheet is inserted between the two sheets, toward the one end of the two-ply sheet.

3. The sheet separation device according to claim 1, further comprising:
    a winding roller to rotate in a predetermined rotational direction to wind the two-ply sheet conveyed by the conveyance roller pair, from the leading end of the two-ply sheet in a sheet conveyance direction; and
    a separator to be inserted into a gap formed at the non-bonding portion between the two sheets of the two-ply sheet at a position between the winding roller and the conveyance roller pair, in a state in which the two-ply sheet is wound from the leading end of the two-ply sheet by the winding roller and an upstream side of the two-ply sheet upstream from the leading end of the two-ply sheet in the sheet conveyance direction is nipped by the conveyance roller pair.

4. The sheet separation device according to claim 3, further comprising:
a sheet conveyance passage between the separator and the winding roller;
two branched sheet conveyance passages branching off in different directions from the sheet conveyance passage between the two branched sheet conveyance passages; and
a switcher to guide the two sheets separated by the separator, to the two branched sheet conveyance passages, respectively.

5. The sheet separation device according to claim 3, further comprising:
a gripper to grip the leading end of the two-ply sheet as a gripped portion, between a receiving portion of the winding roller and the gripper; and
a mover to move the gripper between a gripping position at which the gripper grips the two-ply sheet and a releasing position at which the gripper is released from the gripping position.

6. An image forming apparatus comprising:
the sheet separation device according to claim 1; and
an image former to form an image on an inner sheet to be conveyed to the sheet separation device.

7. An image forming system comprising:
an image former to form an image on an inner sheet; and
the sheet separation device according to claim 1, detachably attached to the image former.

8. A sheet laminator comprising:
the sheet separation device according to claim 1; and
a sheet lamination structure to perform a lamination process on the two-ply sheet in which an inner sheet is inserted between the two sheets separated by the sheet separation device.

9. An image forming apparatus comprising:
the sheet laminator according to claim 8; and
an image former to form an image on the inner sheet to be conveyed to the sheet separation device.

10. An image forming system comprising:
an image former to form an image on the inner sheet; and
the sheet laminator according to claim 8, detachably attached to the image former.

11. A sheet separation device configured to separate a non-bonding portion of a two-ply sheet in which two sheets are overlapped and bonded together at one end as a bonding portion of the two-ply sheet, the sheet separation device comprising:
a conveyance roller pair to convey the two-ply sheet while nipping the two-ply sheet, when separating the non-bonding portion of the two-ply sheet; and
a controller configured to control sheet conveyance,
the controller being configured to:
cause the conveyance roller pair to nip the one end of the two-ply sheet with the non-bonding portion being separated;
stop the conveyance roller pair in a state in which the one end of the two-ply sheet is nipped by the conveyance roller pair with the non-bonding portion being separated;
cause one end of an inner sheet to contact the conveyance roller pair while the conveyance roller pair is stopped so as to correct skew of the inner sheet;
convey the inner sheet toward the one end of the two-ply sheet via the non-bonding portion between the two sheets separated from each other to insert the inner sheet between the two sheets of the two-ply sheet; and
start the conveyance roller pair to rotate to convey the two-ply sheet in which the inner sheet is inserted between the two sheets, toward the one end of the two-ply sheet.

12. The sheet separation device according to claim 11, further comprising:
a winding roller to rotate in a predetermined rotational direction to wind the two-ply sheet conveyed by the conveyance roller pair, from a leading end of the two-ply sheet in a sheet conveyance direction; and
a separator to be inserted into a gap formed at the non-bonding portion between the two sheets of the two-ply sheet at a position between the winding roller and the conveyance roller pair, in a state in which the two-ply sheet is wound from the leading end of the two-ply sheet by the winding roller and an upstream side of the two-ply sheet upstream from the leading end of the two-ply sheet in the sheet conveyance direction is nipped by the conveyance roller pair.

13. The sheet separation device according to claim 12, further comprising:
a sheet conveyance passage between the separator and the winding roller;
two branched sheet conveyance passages branching off in different directions from the sheet conveyance passage between the two branched sheet conveyance passages; and
a switcher to guide the two sheets separated by the separator, to the two branched sheet conveyance passages, respectively.

14. The sheet separation device according to claim 12, further comprising:
a gripper to grip the leading end of the two-ply sheet as a gripped portion, between a receiving portion of the winding roller and the gripper; and
a mover to move the gripper between a gripping position at which the gripper grips the two-ply sheet and a releasing position at which the gripper is released from the gripping position.

15. An image forming apparatus comprising:
the sheet separation device according to claim 11; and
an image former to form an image on the inner sheet to be conveyed to the sheet separation device.

16. An image forming system comprising:
an image former to form an image on the inner sheet; and
the sheet separation device according to claim 11, detachably attached to the image former.

17. A sheet laminator comprising:
the sheet separation device according to claim 11; and
a sheet lamination structure to perform a lamination process on the two-ply sheet in which the inner sheet is inserted between the two sheets separated by the sheet separation device.

18. An image forming apparatus comprising:
the sheet laminator according to claim 17; and
an image former to form an image on the inner sheet to be conveyed to the sheet separation device.

19. An image forming system comprising:
an image former to form an image on the inner sheet; and
the sheet laminator according to claim 17, detachably attached to the image former.

* * * * *